United States Patent
Wang

(10) Patent No.: US 12,236,197 B2
(45) Date of Patent: Feb. 25, 2025

(54) TEXT EXTRACTION METHOD AND DEVICE, COMPUTER READABLE STORAGE MEDIUM AND ELECTRONIC DEVICE

(71) Applicant: BOE TECHNOLOGY GROUP CO., LTD., Beijing (CN)

(72) Inventor: Bingqian Wang, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 556 days.

(21) Appl. No.: 17/622,040

(22) PCT Filed: Dec. 25, 2020

(86) PCT No.: PCT/CN2020/139621
§ 371 (c)(1),
(2) Date: Dec. 22, 2021

(87) PCT Pub. No.: WO2022/134071
PCT Pub. Date: Jun. 30, 2022

(65) Prior Publication Data
US 2022/0398384 A1    Dec. 15, 2022

(51) Int. Cl.
*G06F 40/30* (2020.01)
*G06F 3/08* (2006.01)
(Continued)

(52) U.S. Cl.
CPC .......... *G06F 40/30* (2020.01); *G06F 16/3347* (2019.01); *G06F 40/279* (2020.01)

(58) Field of Classification Search
CPC .......... G06F 40/58; G06F 40/44; G06F 40/45; G06F 40/47; G06N 3/08; G06N 3/0442
See application file for complete search history.

(56) References Cited

U.S. PATENT DOCUMENTS

| | | | |
|---|---|---|---|
| 10,146,751 B1 | 12/2018 | Zhang | |
| 2015/0172243 A1* | 6/2015 | Parikh | .......... H04L 51/212 709/206 |

(Continued)

FOREIGN PATENT DOCUMENTS

| | | |
|---|---|---|
| CN | 107122416 A | 9/2017 |
| CN | 107239445 A | 10/2017 |

(Continued)

OTHER PUBLICATIONS

Written Opinion for International Application No. PCT/CN2020/139621 mailed Sep. 27, 2021.

*Primary Examiner* — Lamont M Spooner
(74) *Attorney, Agent, or Firm* — Perilla Knox & Hildebrandt LLP; Kenneth A. Knox

(57) ABSTRACT

A text extraction method and device, computer-readable storage medium, and electronic device are described that relate to the technical field of machine learning. The method includes: acquiring to-be-extracted data and extracting a current trigger word in the to-be-extracted data using a target trigger word extraction model included in a target event extraction model; generating a current query sentence according to the current trigger word; and extracting a current event argument corresponding to the current trigger word according to the current query sentence and a target argument extraction model included in the target event extraction model, wherein the target trigger word extraction model and the target argument extraction model have a same model structure and parameter, and are connected in a cascading manner.

20 Claims, 8 Drawing Sheets

(51) Int. Cl.
  *G06F 16/334* (2025.01)
  *G06F 40/279* (2020.01)

(56) References Cited

U.S. PATENT DOCUMENTS

| | | | | |
|---|---|---|---|---|
| 2016/0147731 | A1* | 5/2016 | Parikh | G06F 40/274 |
| | | | | 715/261 |
| 2017/0124471 | A1* | 5/2017 | Bharti | G06Q 10/06395 |
| 2017/0300472 | A1* | 10/2017 | Parikh | G06F 40/205 |
| 2019/0065623 | A1* | 2/2019 | Baba | G10L 15/22 |
| 2022/0004714 | A1* | 1/2022 | Li | G06F 40/35 |
| 2022/0100772 | A1* | 3/2022 | Kadarundalagi Raghura | G06F 21/6218 |
| 2022/0100963 | A1* | 3/2022 | Anubhai | G06F 40/30 |
| 2022/0100967 | A1* | 3/2022 | Pushkin | G06F 40/30 |
| 2022/0318505 | A1* | 10/2022 | Pouran Ben Veyseh | G06F 40/126 |
| 2022/0383078 | A1* | 12/2022 | Hou | G06N 3/06 |
| 2023/0255581 | A1* | 8/2023 | Jang | A61B 6/032 |
| | | | | 382/128 |

FOREIGN PATENT DOCUMENTS

| | | |
|---|---|---|
| CN | 107562772 A | 1/2018 |
| CN | 107766585 A | 3/2018 |
| CN | 109299266 B | 11/2019 |
| CN | 111522915 A | 8/2020 |
| CN | 111967268 A | 11/2020 |
| CN | 112084381 A | 12/2020 |

* cited by examiner

TEXT EXTRACTION METHOD AND DEVICE, COMPUTER READABLE STORAGE MEDIUM AND ELECTRONIC DEVICE

CROSS-REFERENCE TO RELATED APPLICATION

The present disclosure is a national phase application under 35 U.S.C. § 371 of International Application No. PCT/CN2020/139621 filed Dec. 25, 2020, the contents of which being incorporated by reference in their entirety herein.

TECHNICAL FIELD

Embodiments of the present disclosure relate to the technical field of machine learning, and in particular, to a text extraction method, a text extraction device, a computer-readable storage medium, and an electronic device.

BACKGROUND

In recent years, with the rise of media digitization and the continuous economic growth, we witness the explosive growth of digital media files. There are massive media files on the Internet, such as a large number of domestic and foreign news. Therefore, how to extract specific events from the massive media files has become a problem that needs to be solved.

In the traditional event definition, the event is composed of an event trigger word and an argument describing a structure of the event. The event trigger word represents occurrence of the event, and the event argument is a carrier of the important information of the event. In some event extraction schemes, the event extraction may be performed by extracting the trigger word and then extracting the event argument.

However, because the trigger word and the event argument are separately extracted, there is a lack of information interaction between the trigger word and the event argument, which makes the correlation between the trigger word and the event argument weaker.

BRIEF SUMMARY

A first aspect of the present disclosure provides a text extraction method, including:
  acquiring to-be-extracted data, and extracting a current trigger word in the to-be-extracted data using a target trigger word extraction model included in a target event extraction model;
  generating a current query sentence according to the current trigger word; and
  extracting a current event argument corresponding to the current trigger word according to the current query sentence and a target argument extraction model included in the target event extraction model,
  wherein the target trigger word extraction model and the target argument extraction model have a same model structure and parameter, and are connected in a cascading manner.

In an exemplary embodiment of the present disclosure, extracting the current trigger word in the to-be-extracted data using the target trigger word extraction model included in the target event extraction model includes:
  calculating a semantic text vector of the to-be-extracted data and an importance degree of each semantic text vector to a to-be-extracted text using a first dynamic weight fusion Bert layer included in the target trigger word extraction model of the target event extraction model, and obtaining a first current encoding vector according to the semantic text vector and the importance degree; and
  obtaining a confidence coefficient that each character included in the to-be-extracted data belongs to the current trigger word by performing calculation on the first current encoding vector with a first fully connected layer included in the target trigger word extraction model;
  determining a start position and an end position of the current trigger word according to whether the confidence coefficient is greater than a first preset threshold; and
  labeling the start position and the end position of the current trigger word with a first preset identifier, and generating the current trigger word by intercepting a character corresponding to a position labeled with the first preset identifier.

In an exemplary embodiment of the present disclosure, the first dynamic weight fusion Bert layer includes a plurality of transformer models; and
  calculating the semantic text vector of the to-be-extracted data and the importance degree of each semantic text vector to the to-be-extracted text using the first dynamic weight fusion Bert layer included in the target trigger word extraction model of the target event extraction model, and obtaining the first current encoding vector according to the semantic text vector and the importance degree includes:
  obtaining a character embedding vector, a character embedding matrix, and a position embedding matrix of the to-be-extracted data by performing word embedding on the to-be-extracted data;
  generating an embedding vector according to the character embedding vector, the character embedding matrix, and the position embedding matrix, and generating a first text semantic vector by inputting the embedding vector into a first transformer model;
  generating a second text semantic vector by input the first text semantic vector into a second transformer model, and obtaining text semantic vectors corresponding to the other transformer models by repeating the step of generating the second text semantic vector; and
  calculating importance degrees of respective transformer models to the to-be-extracted data, and obtaining the first current encoding vector according to respective importance degrees, the embedding vector, and respective text semantic vectors.

In an exemplary embodiment of the present disclosure, obtaining the first current encoding vector according to the respective importance degrees, the embedding vector, and the respective text semantic vectors includes:
  concatenating the respective importance degrees, and normalizing the respective importance degrees concatenated;
  obtaining the first current coding vector according to the respective importance degrees normalized, the embedding vector, and the respective text semantic vectors.

In an exemplary embodiment of the present disclosure, extracting the current event argument corresponding to the current trigger word according to the current query sentence and the target argument extraction model included in the target event extraction model includes:
  generating a first sentence pair according to the to-be-extracted data and the current query sentence, and obtaining a second current encoding vector by encoding the first sentence pair with a second dynamic weight fusion Bert layer included in the target argument extraction model of the target event extraction model;
  calculating a span of the current event argument in the to-be-extracted data according to the second current encoding vector, and obtaining probabilities that characters, at all positions from a start position pointer to an end position pointer, of an argument included in each span belong to a start position and an end position of the current event argument by classifying the argument included in the span, wherein each span includes the start position pointer and the end position pointer;
  determining the start position and the end position of the current event argument according to whether the probability is greater than a second preset threshold, and labeling the start position and the end position of the current event argument with a second preset identifier; and
  generating the current event argument by intercepting a character corresponding to a position labeled with the second preset identifier.

In an exemplary embodiment of the present disclosure, obtaining the probabilities that the characters, at all the positions from the start position pointer to the end position pointer, of the argument included in each span belong to the start position and the end position of the current event argument by classifying the argument included in the span includes:
  obtaining a role label of the argument by classifying roles to which the arguments included in the span belong with a plurality of binary-classification networks;
  generating a start position matrix and an end position matrix according to start position pointers and end position pointers of all the role labels, wherein each row in the start position matrix and the end position matrix represents a role type, and each column corresponds to each character of the to-be-extracted data; and
  obtaining the probabilities that the characters, at all the positions from the start position pointer to the end position pointer, of the argument included in each span belong to the start position and the end position of the current event argument by performing calculation on the start position matrix and the end position matrix with a second fully connected layer included in the target argument extraction model.

In an exemplary embodiment of the present disclosure, the text extraction method further includes:
  calculating a current event polarity and a current event tense of the to-be-extracted data according to the current trigger word and a target event attribute extraction model included in the target event extraction model.

In an exemplary embodiment of the present disclosure, calculating the current event polarity and the current event tense of the to-be-extracted data according to the current trigger word and the target event attribute extraction model included in the target event extraction model includes:
  generating a second sentence pair according to the current trigger word and the to-be-extracted data;
  obtaining a third current encoding vector by encoding the second sentence pair with a third dynamic weight fusion Bert layer included in the target event attribute extraction model;
  obtaining the current event polarity of the to-be-extracted data by performing calculation on the third current encoding vector with a third fully connected layer included in the target event attribute extraction model; and
  obtaining the current event tense of the to-be-extracted data by performing calculation on the third current coding vector with a fourth fully connected layer included in the target event attribute extraction model.

In an exemplary embodiment of the present disclosure, the text extraction method further includes:
  acquiring original text data, and calculating an original trigger word included in the original text data according to a to-be-trained trigger word extraction model included in a to-be-trained event extraction model;
  generating an original query sentence according to the original trigger word, and extracting an original event argument included in the original text data according to the original query sentence and the to-be-trained argument extraction model included in the to-be-trained event extraction model;
  constructing a first loss function according to the target trigger word and the original trigger word of the original text data, and constructing a second loss function according to the target event argument and the original event argument of the original news event; and
  obtaining the target event extraction model by adjusting a parameter included in the to-be-trained event extraction model according to the first loss function and the second loss function.

In an exemplary embodiment of the present disclosure, obtaining the target event extraction model by adjusting the parameter included in the to-be-trained event extraction model according to the first loss function and the second loss function includes:
  obtaining a target loss function by performing a summation operation on the first loss function and the second loss function; and
  obtaining the target event extraction model by adjusting the parameter included in the to-be-trained event extraction model according to the target loss function.

In an exemplary embodiment of the present disclosure, the text extraction method further includes:
  calculating an original event polarity and an original event tense of the original text data according to the original trigger word and a to-be-trained event attribute extraction model;
  constructing a third loss function according to a target event polarity, a target event tense, an original event polarity, and an original event tense of the original text data; and
  obtaining a target attribute extraction model by adjusting the parameter included in the to-be-trained attribute extraction model according to the third loss function.

An aspect of the present disclosure provides a text extraction device, including:
  a first extraction module, configured to acquire to-be-extracted data, and extract a current trigger word in the to-be-extracted data using a target trigger word extraction model included in a target event extraction model;
  a query sentence generation module, configured to generate a current query sentence according to the current trigger word; and a second extraction module, configured to extract a current event argument corresponding to the current trigger word according to the current query sentence and a target argument extraction model included in the target event extraction model, wherein the target trigger word extraction model and the target argument extraction model have a same model structure and weight, and are connected in a cascading manner.

An aspect of the present disclosure provides a computer-readable storage medium having a computer program stored thereon that, when being executed by a processor, causes the processor to implement any one of the above text extraction methods.

An aspect of the present disclosure provides an electronic device, including:

a processor; and a memory having executable instructions of the processor stored thereon, wherein the processor is configured to implement any one of the above text extraction methods by executing the executable instructions.

It should be understood that the above general description and the following detailed description are only exemplary and explanatory, and cannot limit the present disclosure.

BRIEF DESCRIPTION OF THE DRAWINGS

The drawings herein are incorporated into the specification and constitute a part of the specification, show embodiments that conform to the present disclosure, and together with the specification, serve to explain the principle of the present disclosure. Understandably, the drawings in the following description are only some embodiments of the present disclosure, and other drawings may be obtained by those skilled in the art from these drawings without creative work. In which.

DETAILED DESCRIPTION

Figure 1:
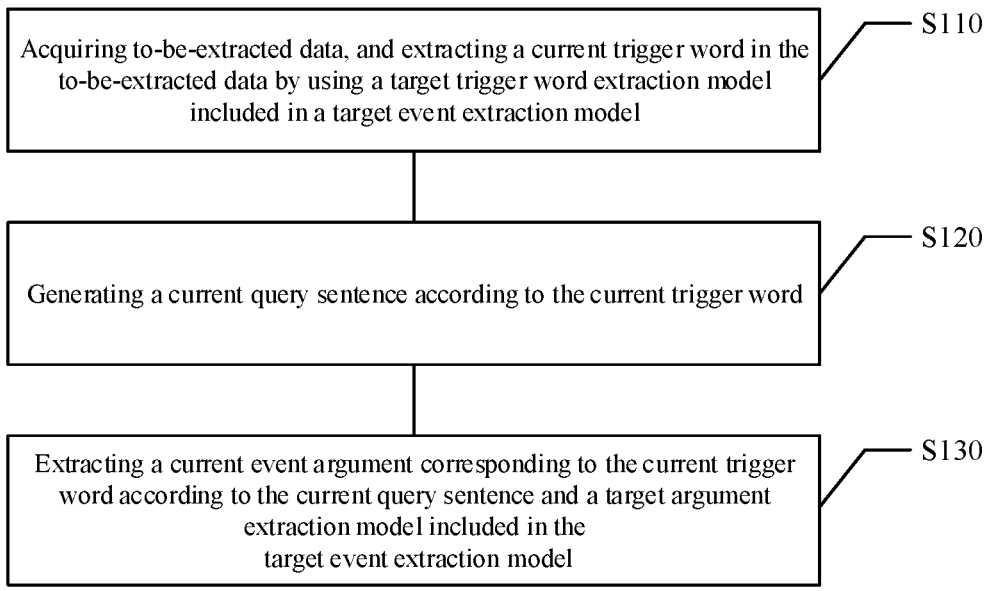
FIG. 1 schematically shows a flowchart of a text extraction method according to an exemplary embodiment of the present disclosure.

Example embodiments will now be described more fully with reference to the accompanying drawings. However, the example embodiments may be implemented in various forms, and should not be construed as being limited to the examples set forth herein; on the contrary, these embodiments are provided to make the present disclosure more comprehensive and complete, and to fully conveys the concept of the example embodiments to those skilled in the art. The described features, structures or characteristics may be combined in one or more embodiments in any suitable way.

In addition, the drawings are only schematic illustrations of the present disclosure, and are not necessarily drawn to scale. The same reference numerals in the figures indicate the same or similar parts, and thus their repeated description will be omitted. Some of the block diagrams shown in the drawings are functional entities and do not necessarily correspond to physically or logically independent entities. These functional entities may be implemented in the form of software, or implemented in one or more hardware modules or integrated circuits, or implemented in different networks and/or processor devices and/or microcontroller devices. The processors and/or devices can include hardware processors, for example.

An example embodiment first provides a text extraction method, which may be implemented in a server, a server cluster, or a cloud server, and the like. Of course, those skilled in the art may also implement the method of the present disclosure in other platforms as required, which is not specifically limited in the exemplary embodiment. As shown in FIG. 1, the text extraction method may include:

step S110, acquiring to-be-extracted data, and extracting a current trigger word in the to-be-extracted data using a target trigger word extraction model included in a target event extraction model;

step S120, generating a current query sentence according to the current trigger word; and step S130, extracting a current event argument corresponding to the current trigger word according to the current query sentence and a target argument extraction model included in the target event extraction model, wherein the target trigger word extraction model and the target argument extraction model have a same model structure and parameter, and are connected in a cascading manner.

The above-referenced text extraction method, in an aspect, includes acquiring the to-be-extracted data and extracting the current trigger word in the to-be-extracted data using the target trigger word extraction model included in the target event extraction model; then, generating the current query sentence according to the current trigger word; and finally, extracting the current event argument corresponding to the current trigger word according to the current query sentence and the target argument extraction model included in the target event extraction model. Since the current event argument is extracted according to the current query sentence generated by the current trigger word, in the process of extracting the current event argument, the information interaction between the current trigger word and the current event argument is fully considered, which solves the problem in the prior art of that, because the trigger word and the event argument are separately extracted, there is a lack of information interaction between the trigger word and the event argument making the correlation between the trigger word and the event argument weaker. Therefore, the method improves the correlation between the current trigger word and the current event argument. In another aspect, the target trigger word extraction model and the target argument extraction model are connected in the cascading manner, which may achieve the extraction of the current event argument corresponding to the current trigger word in a reading and understanding way, achieve semantic representation layer sharing in a cascading structure, and thus, enhance the information interaction between the current trigger word and the current event argument. Further, in another aspect, since the target trigger word extraction model and the target argument extraction model have the same model structure and parameter, the target trigger word extraction model and the target argument extraction model may be simultaneously trained during the model training. Additionally, as long as the parameter adjustment of one model is completed, the parameter of the other model no longer needs to be adjusted, thereby increasing the training speed of the model, which increases the performance of a respective computing device on which the model is executed.

First, terms involved in the present disclosure are explained.

Event text extraction is to make an event in unstructured text to be displayed in a structured form, which plays an important role in the fields of public opinion monitoring, text summarization, automatic question and answer, and automatic construction of affair maps. Meanwhile, the text of real news may have characteristic such as complex sentence pattern, active and passive conversion, and multi-event sharing of subject and object, and the like. Therefore, event text extraction is a very challenging extraction task. An event text extraction task may include four subtasks: trigger word recognition, event type classification, event argument recognition, and role classification.

Restricted domain event extraction refers to pre-defining a type of a to-be-extracted event text and a specific structure of each type (which specific event arguments are included) before the event text extraction. Usually, a certain amount of annotation data is given, and an event of a specified event type and role type is extracted from an unstructured text. For example, the event schema shown in Table 1 may be given, and it may be extracted from Table 2, two events of "competition behavior-success or failure" and "competition behavior-promotion", as well as that "winner" and "promotion party" Raptors, "loser" 76ers, "promotion competition" eastern conference finals and the like (herein, the trigger word here is not part of the event argument).

TABLE 1 event schema

| category | event type | event role | event role | event role |
|---|---|---|---|---|
| competition behavior | success or failure | winner | loser | time |
| competition behavior | promotion | time | promotion party | promotion competition |
| . . . . . . | . . . . . . | . . . . . . | . . . . . . | . . . . . . |

TABLE 2

Leonard won it at the buzzer, the Raptors eliminated the 76ers into the Eastern Conference finals

| competition behavior success or failure | winner | loser | time |
|---|---|---|---|
| competition behavior promotion | Raptors | 76ers | no |
|  | time | promotion party | promotion competition |
|  | no | Raptors | Eastern Conference Finals |

Open-domain event extraction refers to that a possible event type and an event structure are unknown. For example, news event extraction refers to the extraction of an event trigger word, an event argument, and an event attribute from a news text. In the traditional event definition, an event consists of an event trigger word (trigger) and an argument describing an event structure. The event trigger word represents the occurrence of the event, and the event argument is a subject, object, time and location of the event or the like, which is the carrier of important information about the event. The trigger word exists as a predicate of the event, which is part of the event argument, and may be specifically shown in Example 1 and Example 2 below. Meanwhile, the event may also include an event attribute. The event attribute includes an event polarity (polarity) and an event tense (tense), which is an important basis for determining whether the event actually occurs, and may be specifically shown in Example 3 and Example 4 below. Through the polarity, the event is divided into positive, negative, and possible events. Through the tense, the event is divided into events that occurred in the past, that are occurring now and that will occur in the future, and other events whose tense cannot be determined.

Example 1

Text: 北京时间 3 月 27 日晚 上 7 点 15 分, 英国首相鲍里斯约翰逊进确诊感 染了新冠肺炎 (At 7:15 pm on March 27th, Beijing time, British Prime Minister Boris Johnson was diagnosed with being infected with COVID-19).

| trigger word | subject | object | time | location |
|---|---|---|---|---|
| 感染 (infected) | 英国首相鲍里斯约翰逊 (British Prime Minister Boris Johnson) | 新冠肺炎 (COVID-19) | 北京时间 3 月 27 日 (Mar. 27th, Beijing time) | no |

Example 2

Text: 过渡政府部队发言人说，北约的战机 16 日在苏尔特附近击中了一座建筑，炸死大批卡扎菲部队士兵 (A spokesman for the Transitional Government Forces said that NATO fighters hit a building near Sirte on the 16th, killing a large number of Gaddafi soldiers).

| trigger word | subject | object | time | location |
|---|---|---|---|---|
| 击中 (hit) | 北约的战机 (NATO fighters) | 一座建筑 (a building) | 16 日 (16th) | 苏尔特附近 (near Sirte) |
| 炸死 (killing) | 北约的战机 (NATO fighters) | 卡扎菲部队士兵 (Gaddafi soldiers) | 16 日 (16th) | 苏尔特附近 (near Sirte) |

Example 3

Text: 过往世卫组织曾 5 度宣布"国际关注公共卫生紧急事件" (In the past, the World Health Organization has declared "public health emergencies of international concern" 5 times).

| trigger word | polarity | tense |
|---|---|---|
| 宣布 (declared) | positive | past |

Example 4

Text: 英国很可能将恢复接受世界贸易组织条款的规范 (Britain is likely to resume accepting the rules of the World Trade Organization).

| trigger word | polarity | tense |
|---|---|---|
| 恢复接受 (resume accepting) | possible | future |

Figure 2:
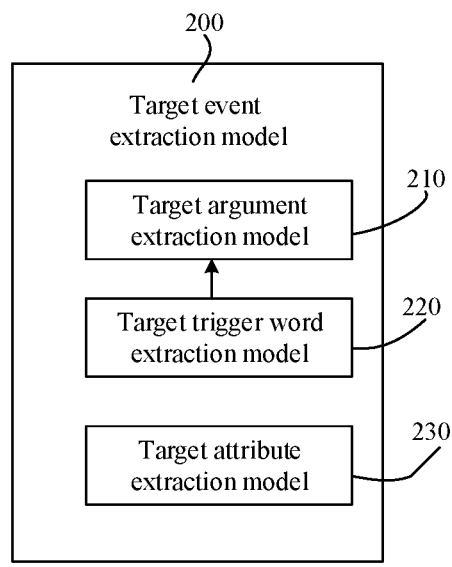
FIG. 2 schematically shows an exemplary diagram of a target event extraction model according to an exemplary embodiment of the present disclosure.

Next, the target event extraction model of the present disclosure is explained and illustrated. As shown in FIG. 2, the target event extraction model may include a target trigger word extraction model and a target argument extraction model. The target trigger word extraction model and the target argument extraction model are connected in a cascading manner. Further, the target event extraction model may also include a target attribute extraction model. The target attribute extraction model is independent of the target trigger word extraction model and the target argument extraction model, and is only input with the trigger word and to-be-extracted data.

Figure 3:
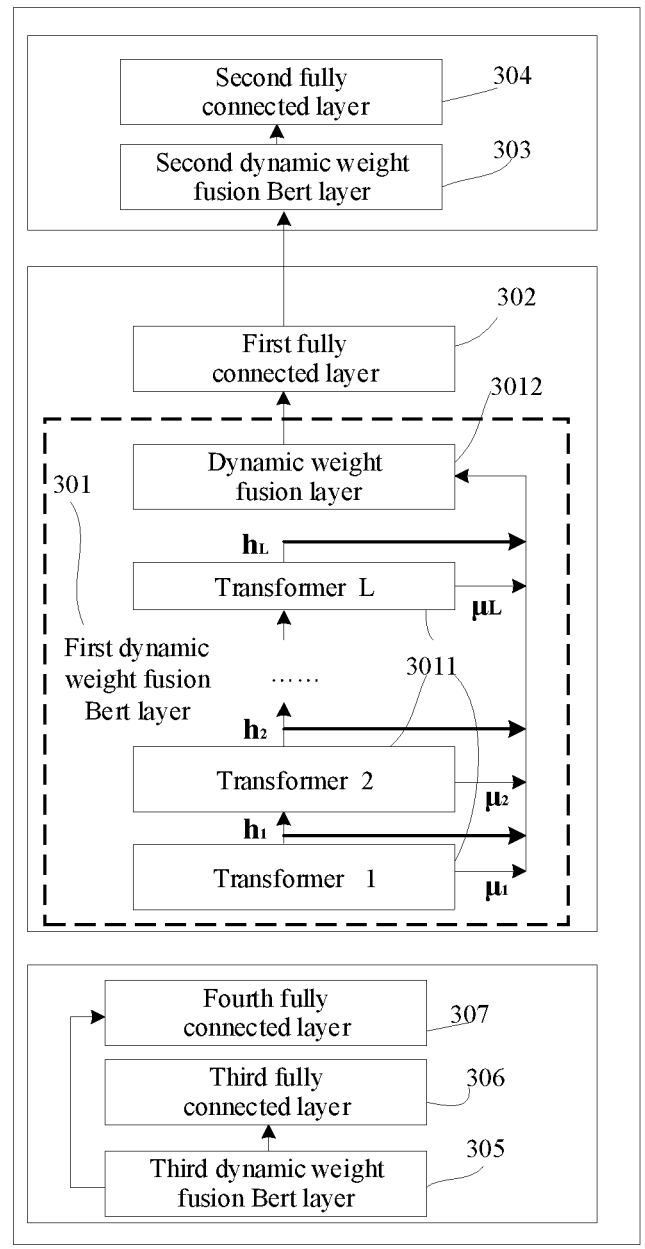
FIG. 3 schematically shows an exemplary diagram of another target event extraction model according to an exemplary embodiment of the present disclosure.

Further, referring to FIG. 3, the target trigger word extraction model may include a first dynamic weight fusion Bert layer 301 and a first fully connected layer 302. The first fully connected layer is composed of Dense+Sigmoid, and the first dynamic weight fusion Bert layer is connected to the first fully connected layer. The first dynamic weight fusion Bert layer 301 includes a plurality of transformer models (transformer encoder 1, transformer encoder 2, . . . , transformer encoder L) 3011, and each transformer model corresponds to a fully connected unit (dense unit). The first dynamic weight fusion Bert layer is used to calculate a first current encoding vector of the to-be-extracted data, the first fully connected layer 302 is used to extract the current trigger word, and the fully connected unit (dense unit) is used to calculate an importance degree of each transformer model. The first dynamic weight fusion Bert layer 301 also includes a dynamic weight fusion layer 3012, which is used to obtain the output of the first dynamic weight fusion Bert layer 301 by performing weight fusion on outputs $h_1$, $h_2$ . . . $h_L$ of the plurality of transformer models and weights $\mu_1$, $\mu_2$ . . . $\mu_L$ of the plurality of transformer models.

Referring to FIG. 3 again, the target argument extraction model includes a second dynamic weight fusion Bert layer 303 and a second fully connected layer 304, the function and connection manner of which are similar to those of the aforementioned target trigger word extraction model, and thus the description thereof will not be repeated herein.

Referring to FIG. 3 again, the target attribute extraction model may include a third dynamic weight fusion Bert layer 305, a third fully connected layer 306, and a fourth fully connected layer 307, and the third dynamic weight fusion Bert layer 305, the third fully connected layer 306 and the fourth fully connected layer 307 are connected in sequence. The third dynamic weight fusion Bert layer is used to calculate a third current encoding vector of a second sentence pair generated according to the current trigger word and the to-be-extracted data. The third fully connected layer is used to calculate a current event polarity of the to-be-extracted data. The fourth fully connected layer is used to calculate a current event tense of the to-be-extracted data.

It should be noted that the first fully connected layer, the second fully connected layer, the third fully connected layer, and the fourth fully connected layer may each include two dense layers and one sigmoid function layer.

Figure 4:
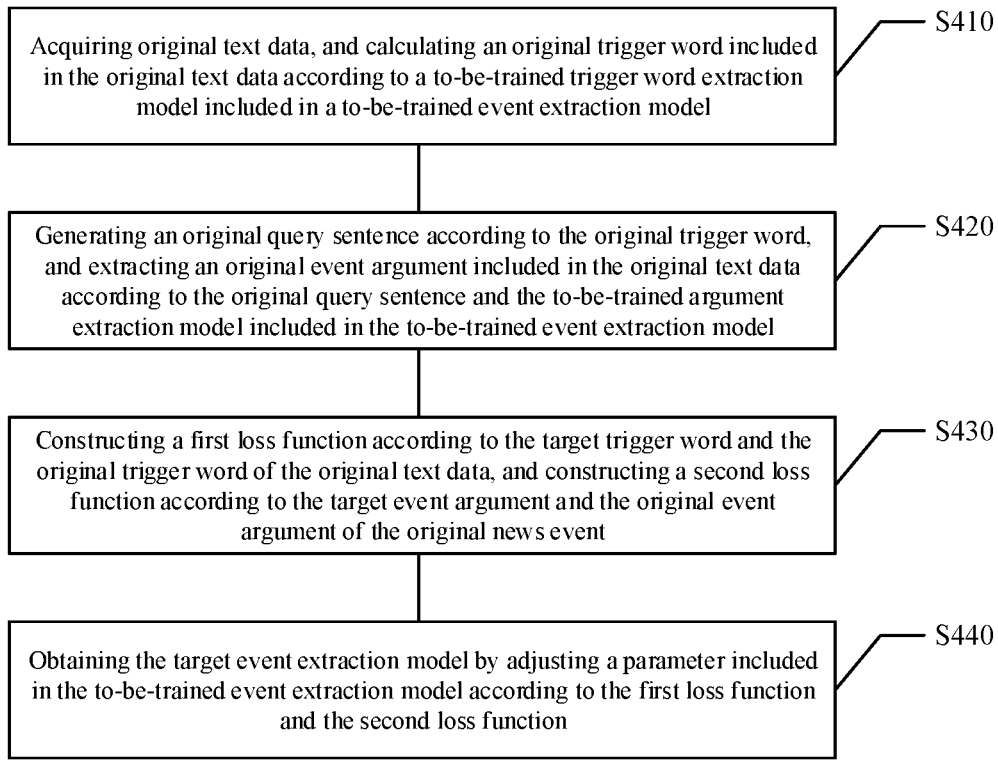
FIG. 4 schematically shows a flowchart of a method for training a to-be-trained event extraction model according to an exemplary embodiment of the present disclosure.

In the following, a training process of the target event extraction model is illustrated and explained. Specifically, referring to FIG. 4, the training process of the target event extraction model may include:

step S410, acquiring original text data, and calculating an original trigger word included in the original text data according to a to-be-trained trigger word extraction model included in a to-be-trained event extraction model;

step S420, generating an original query sentence according to the original trigger word, and extracting an original event argument included in the original text data according to the original query sentence and the to-be-trained argument extraction model included in the to-be-trained event extraction model;

step S430, constructing a first loss function according to the target trigger word and the original trigger word of the original text data, and constructing a second loss function according to the target event argument and the original event argument of the original news event; and step S440, obtaining the target event extraction model by adjusting a parameter included in the to-be-trained event extraction model according to the first loss function and the second loss function.

In an exemplary embodiment, first, a target loss function is obtained by performing a summation operation on the first loss function and the second loss function; then, the target event extraction model is obtained by adjusting the parameter included in the to-be-trained event extraction model according to the target loss function.

Hereinafter, step S410 to step S440 will be explained and illustrated.

First, the encoding principle of the dynamic weight fusion Bert layer (that is, the first dynamic weight fusion Bert layer, the second dynamic weight fusion Bert layer, or the third dynamic weight fusion Bert layer) is explained and illustrated. Specifically, the present disclosure uses Bert as an encoder to extract a semantic feature of text. In particular, at a data input terminal, an input sentence X is first encoded into a character embedding matrix $W_t$ and a position embedding matrix $W_p$, where $X=(x_1, x_2, \ldots, x_n)$. Then, the two vectors of the character embedding matrix and the position embedding matrix are added as the total input embedding representation $h_0$, and then the input vector representation $h_0$ is passed through an N-layer transformer network to obtain a text semantic representation vector $h_l$, which may specifically be shown in the following formula (1) and formula (2):

$$h_0 = XW_t + W_p; \quad \text{Formula (1)}$$

$$h_l = \text{Transformer}(h_{l-1}), l \in [1,N]; \quad \text{Formula (2)}$$

where $h_l$ is a hidden layer vector, that is, output of the $l^{th}$ layer transformer network.

Meanwhile, in order to effectively use the information of each layer in Bert, first, a fully connected unit (dense unit) may be used to learn the importance degree μ of each transformer, and then a final semantic representation may be obtained by performing weight superposition on the results of all the transformer layers, which may specifically be shown in the following formula (3):

$$\mu_l = \sigma(\text{Dense}_{unit=1}(h_l)); \quad \text{Formula (3)}$$

where σ is the ReLu activation function. Then, the weights of respective layers are concatenated, the result of which is normalized with the softmax function to obtain a 1*L weight vector $\mu_L$, which may be specifically shown in the following formula (4):

$$\mu_L = \text{softmax}(\text{concatenate}([\mu_1,\mu_2,\ldots,\mu_l])); \quad \text{Formula (4)}$$

Then, the results of all transformers in the Bert are concatenated to obtain a fusion representation, which may be specifically shown in the following formula (5):

$$h_L = \text{concatenate}([h_1,h_2,\ldots,h_l]); \quad \text{Formula (5)}$$

Finally, the weighted fusion is performed with the weight obtained by the formula (4) (that is, through the dynamic weight fusion layer in FIG. 3) to obtain a final fusion semantic representation $h_{DWF}$, that is, a final encoding vector, which may be specifically shown in the following formula (6):

$$h_{DWF} = \text{matmul}([\mu_L, h_L]); \quad \text{Formula (6)}$$

It should be further noted that since the weight is automatically updated according to the importance degree of each layer during the network training process, the Bert layer may be called a dynamic weight fusion Bert (DWF-BERT).

Next, the steps S410 to S440 are explained and illustrated in combination with the encoding principle of the dynamic weight fusion Bert layer. Specifically, first, the original text data is input into an underlying DWF-BERT model in a single input mode, that is: the sentence is encoded into: [CLS: head vector, sentence text vector] 北京时间3 月27 日晚, 英国首相鲍里斯约翰逊确诊感染了新冠肺炎 (On the evening of March 27, Beijing time, British Prime Minister Boris Johnson was diagnosed with being infected with COVID-19) [SEP, two input separators], which is input to the underlying DWF-BERT model (the first dynamic weight fusion Bert layer) to obtain the encoding vector output by the BERT, and then the encoding vector output by the BERT is passed through the first fully connected layer, and the value at each position of the final output sequence is the confidence coefficient of the start and end positions of the entity, details of which may refer to FIG. 5. Here, the position with the confidence coefficient greater than 0.45 is the start and end positions of the entity, and the corresponding position of the original text data may be intercepted to obtain the original trigger word.

Figure 5:
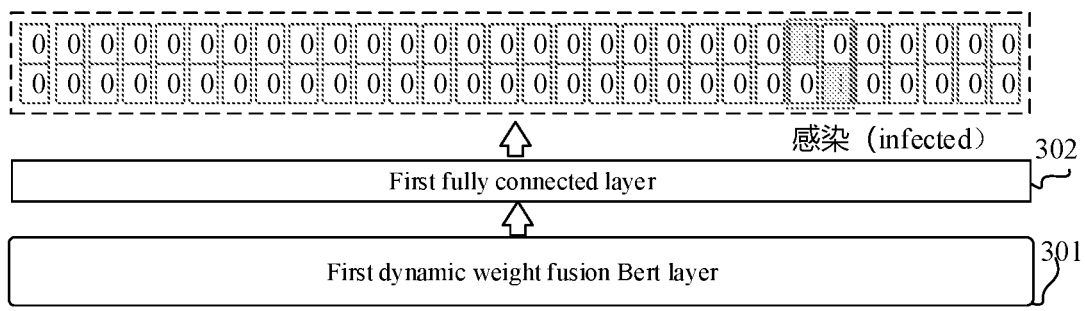
FIG. 5 schematically shows an exemplary diagram of an original trigger word extraction process according to an exemplary embodiment of the present disclosure.

The specific calculation process of the confidence coefficient may be shown in the following formula (7) and formula (8):

$$t_i^s = \sigma(W_s x_i + b_s); \quad \text{Formula (7)}$$

$$t_i^e = \sigma(W_e x_i + b_e); \quad \text{Formula (8)}$$

where $x_i = h_{DWF}[i]$, that is, an encoding vector output after the $i^{th}$ character of the original text data is encoded by the BERT, σ is s sigmoid activation function, $W_{start}$ and $W_{end}$ are preset trainable weights (parameters), $b_s$ and $b_e$ are corresponding bias terms (parameters), $t_i^s$ and $t_i^e$ are respectively the probabilities that the $i^{th}$ character of the original text data is the start position and the end position of the trigger word, when the probability is greater than the preset threshold (0.45), the corresponding position will be labeled with 1, otherwise it will be labeled with 0, details of which may refer to FIG. 5.

Secondly, when the original trigger word is obtained, the original event argument corresponding to the original trigger word needs to be extracted. Specifically, the present disclosure regards the original event argument extraction as being achieved by a sequence labeling task. In the sequence labeling task, unlike the traditional BiLSTM-CRF-based sequence labeling scheme, the present disclosure adopts a reading and understanding method combined with a multilayer label pointer network to achieve the event argument labeling.

Specifically, first, the query sentence (query) may be constructed from the original trigger word obtained by the to-be-trained trigger word extraction model. For example, as for the example sentence "北京时间3 月27 日晚, 英国首相鲍里斯约翰逊确 诊感染了新冠肺炎 (On the evening of March 27, Beijing time, British Prime Minister Boris Johnson was diagnosed with being infected with COVID-19)", the word "感染 (infected)" is extracted as the original trigger word, then the constructed query sentence (query) would be: "找出跟#感染#有关的主体, 客体, 时间和地点 (find out subject, object, time and location related to #infected #)". When the query sentence is obtained, the query and the original text data may be formed into a sentence pair. The sentence pair may be, for example: "[CLS]找出 跟#感染#有关的主体，客体，时间和地点 [SEP]北京时间 3 月 27 日晚，英国首相鲍里斯 约翰逊确诊感染了新冠肺炎 [SEP] ([CLS] find out subject, object, time and location related to #infected # [SEP] On the evening of March 27, Beijing time, British Prime Minister Boris Johnson was diagnosed with being infected with COVID-19 [SEP])". Then, the sentence pair is passed into the DWF-BERT model in a two-input mode. It should be noted that in order to highlight the role of the original trigger word, the symbol "#" may be added to the left and right of the trigger word "infected" in the query of the sentence pair, and other symbols are also possible, which is not limited in the embodiment. Unlike the traditional reading and understanding manner, the query sentence (query) does not correspond to the answer one-to-one. Therefore, each event argument type is still labeled in a labeling manner, and the purpose of constructing the query is to enhance the semantic information of the trigger word, so as to better get the event argument corresponding to the current trigger word.

Further, an upper layer DWF-BERT model (the second dynamic weight fusion Bert layer) is used to encode the sentence pair composed of the query sentence and the original text data. The specific encoding process is similar to the above encoding process of the original text data, which is not repeated herein. Meanwhile, when a code of the sentence pair is obtained, the code of the sentence pair is input to the second fully connected layer to obtain the original event argument. The specific processing process may be as follows.

In order to extract a plurality of event arguments at the same time, two 0/1 sequences are generated through two binary-classification networks to determine a span of the event argument in the sequence (each span is determined by a start position pointer (start) and an end position pointer (end)). Then, a role classification is performed on the argument span through a plurality of binary-classification networks. Each character in the input sequence may be represented as the start position and the end position of the argument, and the span composed of text between any two characters may be expressed as any event role.

Figure 6:
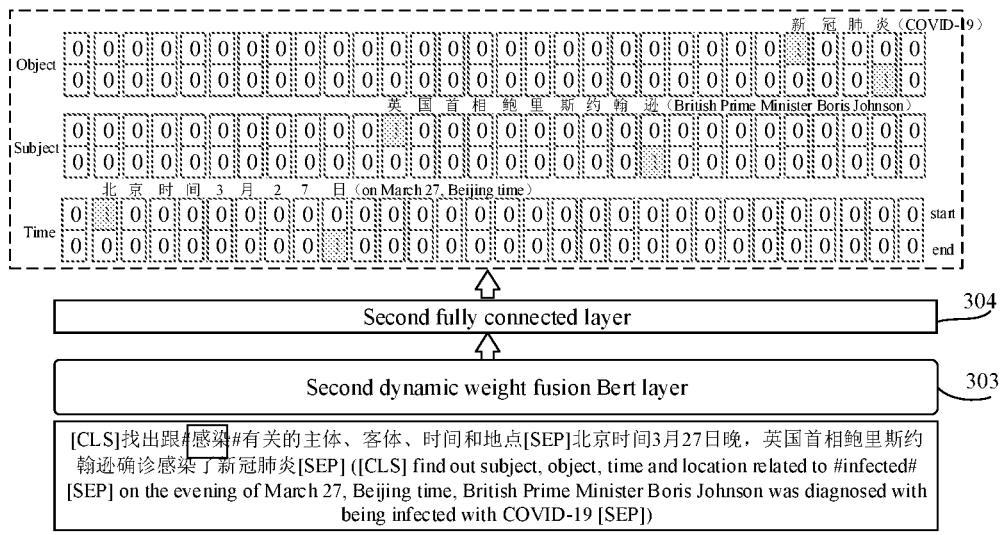
FIG. 6 schematically shows an exemplary diagram of an original event argument extraction process according to an exemplary embodiment of the present disclosure.

FIG. 6 shows a labeling example corresponding to the input sample of the sentence pair obtained from the query sentence and the original text data. Each role corresponds to a set of pointer vectors (start, end). Two two-dimensional matrices may be obtained by combining the start and end pointer vectors of all labels together, which are denoted as $S_s$ and $S_e$. Each row of the $S_s$ and $S_e$ represents a role type, and each column thereof corresponds to a character in the text. In the present disclosure, the start position and end position and the role type of the argument are determined by predicting probabilities that all positions of the start and end pointer vectors corresponding to each role of the input sequence are 0/1 through a plurality of binary-classification networks. The whole task may be regarded as that the multi-label classification is performed on each character of the input sequence, and the probability values $p_i^{s\_r}$ and $p_i^{e\_r}$ of the $i^{th}$ character being predicted as the start position and the end position of the argument of the role r may be respectively shown in the following formula (9) and formula (10):

$$p_i^{s\_r} = \sigma(W_s^r x_i + b_s^r); \qquad \text{Formula (9)}$$

$$p_i^{e\_r} = \sigma(W_e^r x_i + b_e^r); \qquad \text{Formula (10)}$$

where $p_i^{s\_r}$ is a start position probability, $p_i^{e\_r}$ is an end position probability, $x_i = h_{DWF}[i]$ that is, an encoding vector output after the BERT encoding of the $i^{th}$ character in the sentence pair, $\sigma$ is a sigmoid activation function, and $W_s^r$ and $W_e^r$ are preset trainable weights (parameters), and $b_s^r$ and $b_e^r$ are corresponding bias terms (parameters). When the probability is greater than the preset threshold (0.45), the corresponding position will be labeled as 1, otherwise it will be labeled as 0 (as shown in FIG. 6), and the corresponding position of the original text data may be intercepted to obtain the original event argument.

Further, after the original trigger word and the original event argument are obtained, a first loss function may be constructed according to the original trigger word and the target trigger word corresponding to the original trigger word, and a second loss function may be constructed according to the original event argument and the target event argument corresponding to the original event argument. Both the first loss function and the second loss function may adopt a binary cross-entropy loss function, which may be specifically shown in the following formula (10) and formula (11):

$$loss_{trigger} = -\sum_{i=1}^{n+2} \tilde{t}_i^s \log(t_i^s) - \sum_{j=1}^{n+2} \tilde{t}_j^e \log(t_j^e); \qquad \text{Formula(10)}$$

$$loss_{argument} = -\sum_{i=k}^{m+3} \tilde{y}_i^{s\_r} \log(p_i^{s\_r}) - \sum_{j=k}^{m+3} \tilde{y}_j^{e\_r} \log(p_j^{e\_r}); \qquad \text{Formula(11)}$$

where $loss_{trigger}$ is the first loss function, $loss_{argument}$ is the second loss function, $\tilde{t}_i^s$ and $\tilde{t}_j^e$ are known correct classification labels corresponding to the target trigger word, $t_i^s$ and $t_j^e$ are output probabilities, n is the number of characters of the original text data (a length of the input sequence), $y_i^{s\_r}$ and $y_j^{e\_r}$ are known correct classification labels corresponding to the target event argument, $p_i^{s\_r}$ and $p_j^{e\_r}$ are output probabilities, m is an overall length of the input sequence, k is a length of the query sentence. Meanwhile, when calculating the second loss function, the loss of the query sentence is not considered.

Finally, after the first loss function and the second loss function are obtained, a summation operation may be performed on the first loss function and the second loss function to obtain a target loss function loss, which may be specifically shown in the following formula (12):

$$loss = loss_{trigger} + loss_{argument}; \qquad \text{Formula (12)}$$

Finally, the target event extraction model may be obtained by adjusting the parameter included in the to-be-trained event extraction model according to the target loss function.

Figure 7:
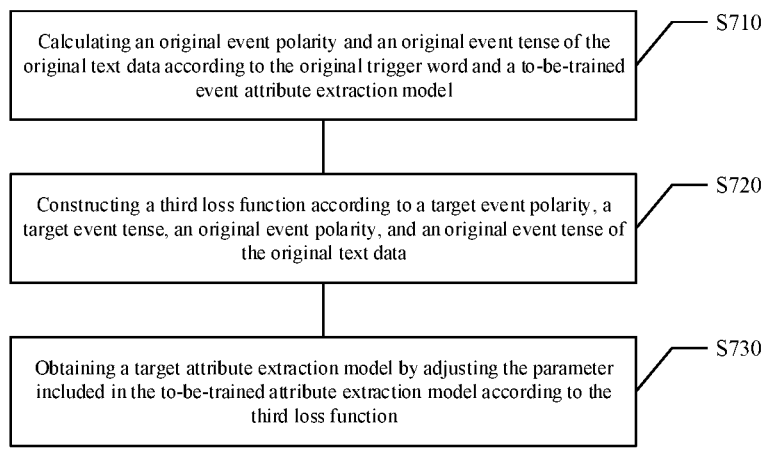
FIG. 7 schematically shows a flowchart of a method for training a to-be-trained event attribute extraction model according to an exemplary embodiment of the present disclosure.

Further, in order to further improve the accuracy of the extracted event, an event attribute extraction model may also be added. Therefore, in order to extract an event attribute based on the event extraction model, a to-be-trained event attribute extraction model may be trained. Referring to FIG. 7, the specific training process may include:

step S710, calculating an original event polarity and an original event tense of the original text data according to the original trigger word and a to-be-trained event attribute extraction model;

step S720, constructing a third loss function according to a target event polarity, a target event tense, an original event polarity, and an original event tense of the original text data; and step S730, obtaining a target attribute extraction model by adjusting the parameter included in the to-be-trained attribute extraction model according to the third loss function.

Figure 8:
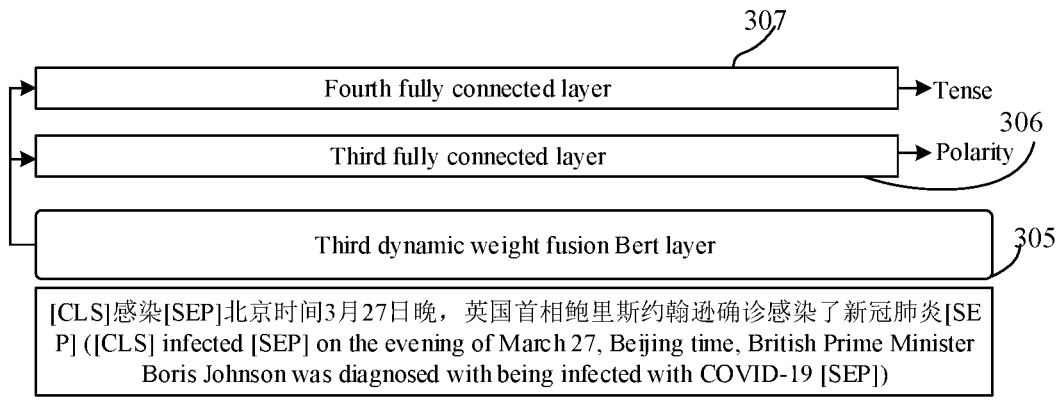
FIG. 8 schematically shows an exemplary diagram of an original event attribute extraction process according to an exemplary embodiment of the present disclosure.

Hereinafter, step S710 to step S730 will be explained and illustrated. Specifically, the event attribute includes an event polarity and an event tense. The event polarity and the event tense are important basis for measuring whether an event actually occurs. According to the event polarity, the event may be divided into a positive event, a negative event, and a possible event. According to the event tense, the event may be divided into an event that occurred in the past, an event that are occurring now, an event that will occur in the further, and other events whose tense cannot be determined. Based on this, the original trigger word and the original text data may be spliced into a sentence pair, and then the sentence pair is input into the DWF-Bert (a third dynamic weight fusion Bert layer) of the to-be-trained event attribute extraction model to obtain the code corresponding to the sentence pair. Then, the code corresponding to the sentence pair is input to the third fully connected layer and the fourth fully connected layer respectively to obtain the original event polarity and original event tense. That is, the [CLS] is used to label the vector for connecting to the two fully connected layers to classify the tense and polarity respectively. The two tasks share the DWF-BERT network and are optimized at the same time, details of which are shown in FIG. 8. An event polarity classification result $\tilde{y}^p$ and an event tense classification result $\tilde{y}^t$ output by the to-be-trained event attribute extraction model may be respectively shown in the following formula (13) and formula (14):

$$\tilde{y}^p = \text{softmax}(W_p h_{DWF-CLS} + b_p); \quad \text{Formula (13)}$$

$$\tilde{y}^t = \text{softmax}(W_t h_{DWF-CLS} + b_t); \quad \text{Formula (14)}$$

where $W_p$ and $W_t$ are preset trainable parameter matrixes (parameters), $W_p \in R^{K \times H}$, $W_t \in R^{J \times H}$, K is the number of label types of the event polarity, J is the number of label types of the event tense, H is a dimension of a hidden layer of the network, $b_p$ and $b_t$ are bias terms (parameters), $h_{DWF-CLS}$ is an encoding vector that is output by DWF-Bert and is obtained according to the sentence pair spliced by the original trigger word and the original text data.

Further, after the original event polarity and the original event tense are obtained, a third loss function may be constructed and then the to-be-trained event attribute extraction model may be trained according to the third loss function. The third loss function may be specifically shown in the following formula (15):

$$L = -\Sigma_i^k y_i^p \log(\tilde{y}_i^p) - \Sigma_i^j y_i^t \log(\tilde{y}_i^t); \quad \text{Formula (15)}$$

where L is the third loss function, $y_i^p$ and $y_i^t$ are classification results of the original event polarity and the original event tense, and $\tilde{y}_i^p$ and $\tilde{y}_i^t$ are correct classification labels corresponding to the target event polarity and the target event tense.

Hereinafter, step S110 to step S130 will be explained and illustrated with reference to FIG. 2 to FIG. 8.

In step S110, to-be-extracted data is acquired, and a current trigger word in the to-be-extracted data is extracted using a target trigger word extraction model included in a target event extraction model.

Figure 9:
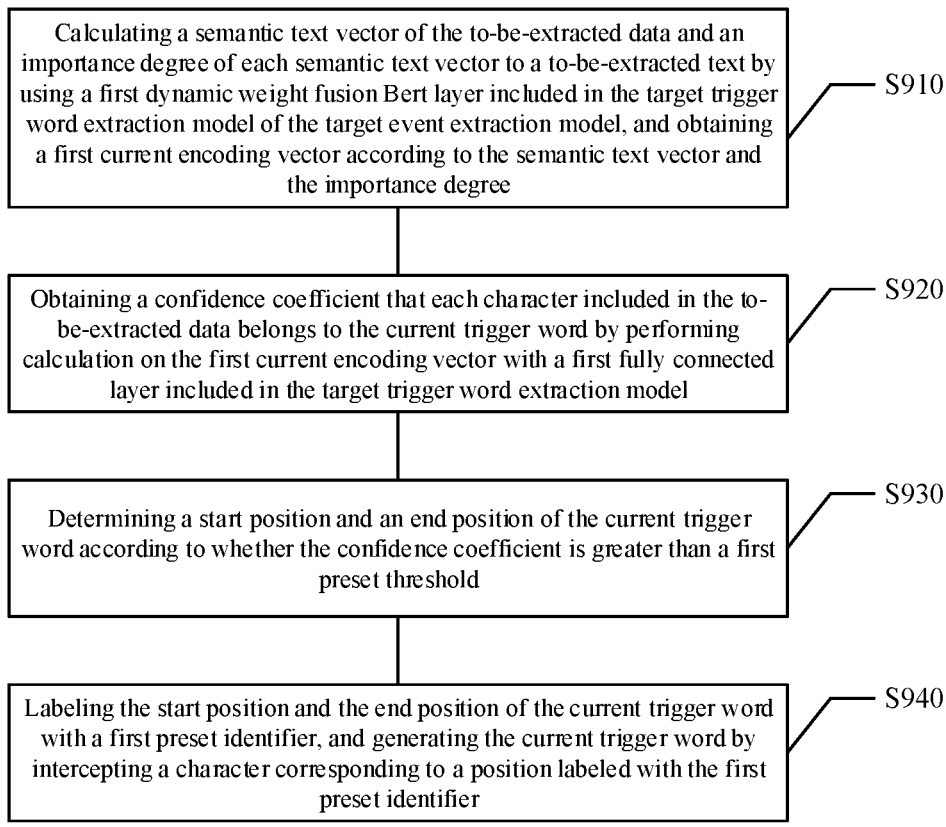
FIG. 9 schematically shows a flow chart of a method for extracting a current trigger word included in to-be-extracted data using a target trigger word extraction model included in a target event extraction model according to an exemplary embodiment of the present disclosure.

Specifically, the to-be-extracted data may be obtained from a database or a platform. The to-be-extracted data may include oversea news events, and may also include other text data, which is not limited in the embodiment. After the to-be-extracted data is obtained, the target trigger word extraction model included in the target event extraction model may be used to extract the current trigger word included in the to-be-extracted data. Specifically, referring to FIG. 9, extracting the current trigger word in the to-be-extracted data using the target trigger word extraction model included in the target event extraction model may include step S910 to step S940.

In step S910, a semantic text vector of the to-be-extracted data and an importance degree of each semantic text vector to a to-be-extracted text is calculated using a first dynamic weight fusion Bert layer included in the target trigger word extraction model of the target event extraction model, and a first current encoding vector is obtained according to the semantic text vector and the importance degree. The first dynamic weight fusion Bert layer includes a plurality of transformer models.

In an exemplary embodiment, first, a character embedding vector, a character embedding matrix, and a position embedding matrix of the to-be-extracted data are obtained by performing word embedding on the to-be-extracted data. Then, an embedding vector is generated according to the character embedding vector, the character embedding matrix, and the position embedding matrix, and a first text semantic vector is generated by inputting the embedding vector into a first transformer model. Then, text semantic vectors corresponding to other transformer models are obtained by inputting the first text semantic vector into the other transformer models, wherein in the other transformer models, output of a previous transformer model is input of a next transformer model to the previous transformer model. Finally, importance degrees of respective transformer models to the to-be-extracted data are calculated, and the first current encoding vector is obtained according to respective importance degrees, the embedding vector, and respective text semantic vectors.

Obtaining the first current encoding vector according to the respective importance degrees, the embedding vector, and the respective text semantic vectors may include: first, concatenating the respective importance degrees, and normalizing the respective importance degrees concatenated; and then, obtaining the first current coding vector according to the respective importance degrees normalized, the embedding vector, and the respective text semantic vectors.

In step S920, a confidence coefficient that each character included in the to-be-extracted data belongs to the current trigger word is obtained by performing calculation on the first current encoding vector with a first fully connected layer included in the target trigger word extraction model.

In step S930, a start position and an end position of the current trigger word is determined according to whether the confidence coefficient is greater than a first preset threshold.

In step S940, the start position and the end position of the current trigger word is labeled with a first preset identifier, and the current trigger word is generated by intercepting a character corresponding to a position labeled with the first preset identifier.

Hereinafter, step S910 to step S940 will be explained and illustrated. First, a first transformer model is used to encode a sentence X of the to-be-extracted text into a character embedding matrix $W_t$ and a position embedding matrix $W_p$, where $X = (x_1, x_2, \ldots, x_n)$. Then, the two vectors of the character embedding matrix and the position embedding matrix are added as the total embedding vector $h_0$, and then the embedding vector $h_0$ is passed through the other transformer models to obtain a plurality of text semantic representation vectors $h_l$ (such as a first text semantic vector, a second text semantic vector and the like), which may be specifically shown in the following formula (1) and formula (2):

$$h_0 = XW_t + W_p; \quad \text{Formula (1)}$$

$$h_l = \text{Transformer}(h_{l-1}), l \in [1, N]; \quad \text{Formula (2)}$$

where $h_l$ is the text semantic vector of each layer, that is, output of the lth layer transformer network.

Meanwhile, in order to effectively use the information of each layer in Bert, first, a fully connected unit (dense unit) may be used to learn the importance degree μ of each transformer, and then a final semantic representation may be obtained by performing weight superposition on the results of all the transformer layers, which may specifically be shown in the following formula (3):

$$\mu_l = \sigma(\text{Dense}_{unit=1}(h_l)); \quad \text{Formula (3)}$$

where σ is the ReLu activation function. Then, the weights of respective layers are concatenated, the result of which is normalized with the softmax function to obtain a 1*L weight vector $\mu_L$, which may be specifically shown in the following formula (4):

$$\mu_L = \text{softmax}(\text{concatenate}([\mu_1, \mu_2, \ldots, \mu_l])); \quad \text{Formula (4)}$$

Then, the results of all transformers in the Bert are concatenated to obtain a fusion representation, which may be specifically shown in the following formula (5):

$$h_L = \text{concatenate}([h_1, h_2, \ldots, h_l]); \quad \text{Formula (5)}$$

Finally, the weighted fusion is performed with the weight obtained by the formula (4) to obtain a final fusion semantic representation $h_{DWT}$, that is, a first current encoding vector, which may be specifically shown in the following formula (6):

$$h_{DWF} = \text{matmul}([\mu_L, h_L]); \quad \text{Formula (6)}$$

Then, the first current encoding vector is passed through two dense layers (the first fully connected layer), and using the Sigmod activation function, the value at each position of the final output sequence is the confidence coefficient of the start position and the end position of the entity. Here, the position with the confidence coefficient greater than 0.45 is taken as the start position and the end position of the entity, and the current trigger word may be obtained by intercepting the corresponding position of the to-be-extracted data.

The specific calculation process of the confidence coefficient may be shown in the following formula (7) and formula (8):

$$t_i^s = \sigma(W_s x_i + b_s); \quad \text{Formula (7)}$$

$$t_i^e = \sigma(W_e x_i + b_e); \quad \text{Formula (8)}$$

where $x_i = h_{DWF}[i]$, that is, the $i^{th}$ vector in the first current encoding vector, σ is a sigmoid activation function, $W_{start}$ and $W_{end}$ are weights of the target trigger word extraction model, $b_s$ and $b_e$ are corresponding bias terms, $t_i^s$ and $t_i^e$ are respectively confidence coefficients that the $i^{th}$ character of the to-be-exacted data is the start position and the end position of the trigger word, when the confidence coefficient is greater than the preset threshold (0.45), the corresponding position will be labeled with 1, otherwise it will be labeled with 0.

In step S120, a current query sentence is generated according to the current trigger word.

For example, in the example sentence (to-be-extracted data) "北京时间 3 月 27 月日晚, 英国首相鲍里斯约翰逊确诊感染了新冠肺炎 (On the evening of March 27, Beijing time, British Prime Minister Boris Johnson was diagnosed with being infected with COVID-19)", "感染 (infected)" is extracted as the trigger word, and "找出跟#感染#有关的 主体, 客体, 时间和地点 (find out subject, object, time and location related to #infected #)" is constructed as the current query sentence (query).

In step S130, a current event argument corresponding to the current trigger word is extracted according to the current query sentence and a target argument extraction model included in the target event extraction model, wherein the target trigger word extraction model and the target argument extraction model have a same model structure and parameter, and are connected in a cascading manner.

Figure 10:
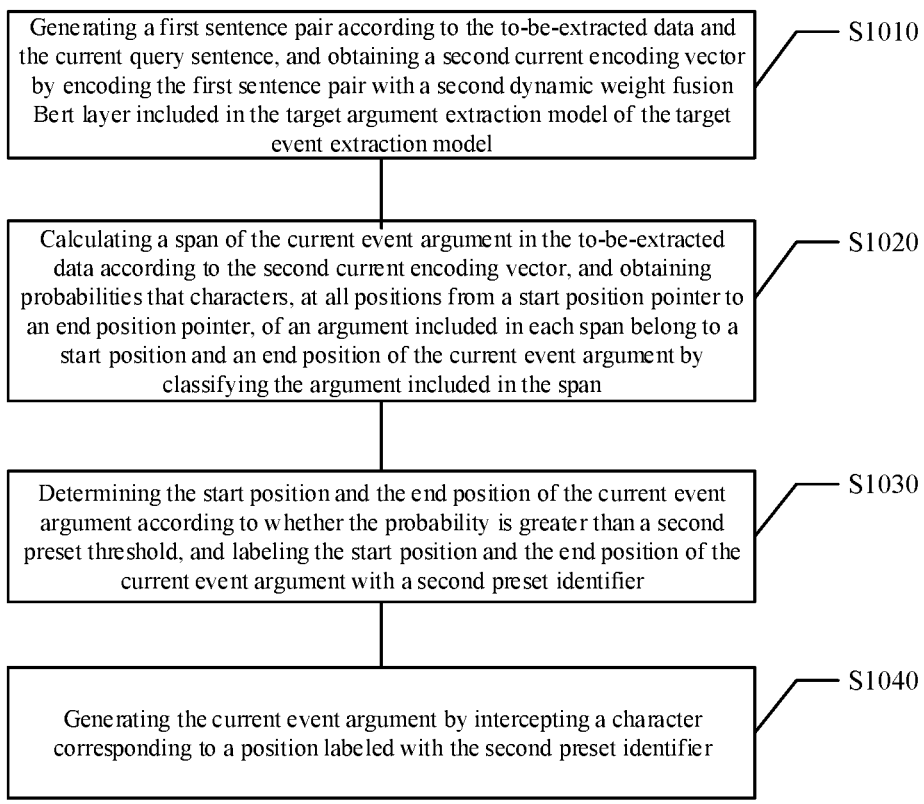
FIG. 10 schematically shows a flowchart of a method for extracting a current event argument corresponding to a current trigger word according to a current query sentence and a target argument extraction model included in a target event extraction model according to an exemplary embodiment of the present disclosure.

In an exemplary embodiment, referring to FIG. 10, extracting the current event argument corresponding to the current trigger word according to the current query sentence and the target argument extraction model included in the target event extraction model may include step S1010 to step S1040.

In step S1010, a first sentence pair is generated according to the to-be-extracted data and the current query sentence, and a second current encoding vector is obtained by encoding the first sentence pair with a second dynamic weight fusion Bert layer included in the target argument extraction model of the target event extraction model.

In step S1020, a span of the current event argument in the to-be-extracted data is calculated according to the second current encoding vector, and probabilities that characters, at all positions from a start position pointer to an end position pointer, of an argument included in each span belong to a start position and an end position of the current event argument are obtained by classifying the argument included in the span, wherein each span includes the start position pointer and the end position pointer.

Obtaining the probabilities that the characters, at all the positions from the start position pointer to the end position pointer, of the argument included in each span belong to the start position and the end position of the current event argument by classifying the argument included in the span may include: first, obtaining a role label of the argument by classifying roles to which the arguments included in the span belong with a plurality of binary-classification networks; then, generating a start position matrix and an end position matrix according to start position pointers and end position pointers of all the role labels, wherein each row in the start position matrix and the end position matrix represents a role type, and each column corresponds to each character of the to-be-extracted data; and finally, obtaining the probabilities that the characters, at all the positions from the start position pointer to the end position pointer, of the argument included in each span belong to the start position and the end position of the current event argument by performing calculation on the start position matrix and the end position matrix with a second fully connected layer included in the target argument extraction model.

In step S1030, the start position and the end position of the current event argument are determined according to whether the probability is greater than a second preset threshold, and the start position and the end position of the current event argument is labeled with a second preset identifier.

In step S1040, the current event argument is generated by intercepting a character corresponding to a position labeled with the second preset identifier.

Hereinafter, step S1010 to step S1040 will be explained and illustrated. Specifically, when the query sentence is obtained, the query and the original text data may be formed into the first sentence pair. The sentence pair may be, for example, "[CLS] 找出跟#感 染#有关的主体，客体，时间和地点 [SEP] 北京时间 3 月 27 日晚，英国首相鲍里斯约翰逊确诊感染了 新冠肺炎 [SEP] ([CLS] find out subject, object, time and location related to #infected # [SEP] On the evening of March 27, Beijing time, British Prime Minister Boris Johnson was diagnosed with being infected with COVID-19 [SEP])". Then, the first sentence pair is passed into the second dynamic weight fusion Bert layer in a two-input mode to obtain the second current encoding vector. The specific generation process of the second current encoding vector is similar to that of the first current encoding vector, which will not be repeated herein.

Meanwhile, after the second current encoding vector is obtained, in order to extract a plurality of event arguments at the same time, two 0/1 sequences are generated through two binary-classification networks to determine a span of the event argument in the sequence (each span is determined by a start position pointer (start) and an end position pointer (end)). Then, a role classification is performed on the argument span through a plurality of binary-classification networks. Each character in the input sequence may be represented as the start position and the end position of the argument, and the span composed of text between any two characters may be expressed as any event role. Then, a start position matrix $S_s$ and a position matrix $S_e$ may be obtained by combining the start and end pointer vectors of all labels together. Each row of the $S_s$ and $S_e$ represents a role type, and each column thereof corresponds to a character in the text. In the present disclosure, the start position and end position and the role type of the argument are determined by predicting probabilities that all positions of the start and end pointer vectors corresponding to each role of the input sequence are 0/1 through a plurality of binary-classification networks. The whole task may be regarded as that the multi-label classification is performed on each character of the input sequence, and the probability values $p_i^{s\_r}$ and $p_i^{e\_r}$ of the $i^{th}$ character being predicted as the start position and the end position of the argument of the role r may be respectively shown in the following formula (9) and formula (10):

$$p_i^{s\_r} = \sigma(W_s^r x_i + b_s^r);$$  Formula (9)

$$p_i^{e\_r} = \sigma(W_e^r x_i + b_e^r);$$  Formula (10)

where $p_i^{s\_r}$ is a start position probability, $p_i^{e\_r}$ is an end position probability, $x_i = h_{DWF}[i]$, that is, an encoding vector output after the BERT encoding of the $i^{th}$ character in the sentence pair, σ is a sigmoid activation function, and $W_s^r$ and $W_e^r$ are preset trainable weights (parameters), and $b_s^r$ and $b_e^r$ are corresponding bias terms (parameters). When the probability is greater than the preset threshold (0.45), the corresponding position will be labeled as 1, otherwise it will be labeled as 0, and the corresponding position of the original text data may be intercepted to obtain the original event argument.

It should be further noted that the weight in the second dynamic weight fusion Bert layer changes with the change of the weight in the first dynamic weight fusion Bert layer, which further improves the relevance between the current trigger word and the current event argument, thereby improving the accuracy of the event text.

Further, in order to further improve the accuracy of the event text, the text extraction method may further include: calculating a current event polarity and a current event tense of the to-be-extracted data according to the current trigger word and a target event attribute extraction model included in the target event extraction model.

Figure 11:
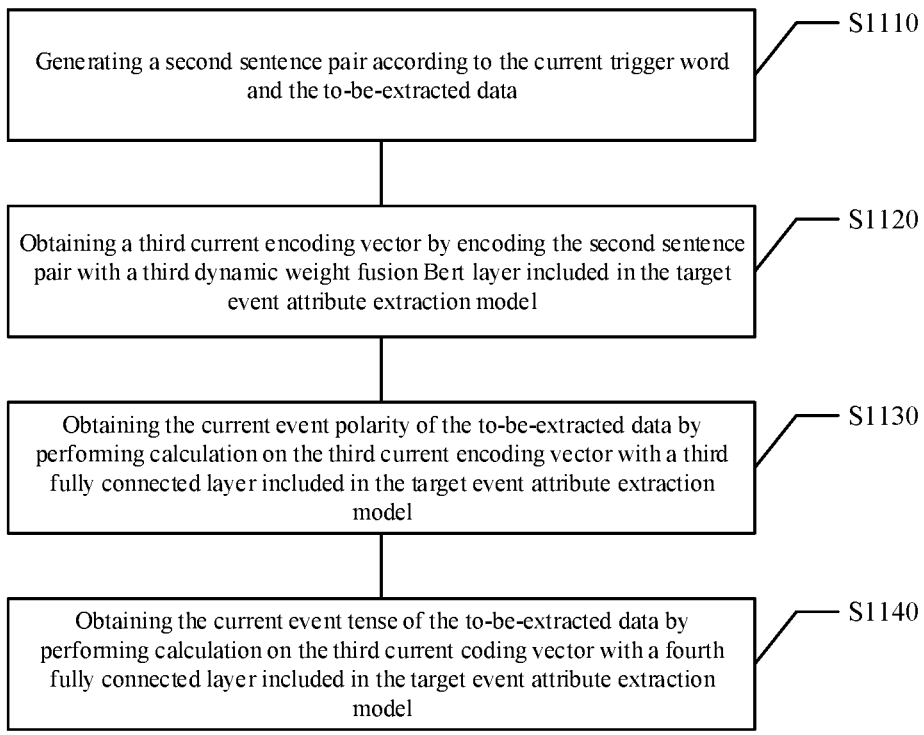
FIG. 11 schematically shows a flowchart of a method for calculating a current event polarity and a current event tense of to-be-extracted data according to a current trigger word and a target event attribute extraction model included in a target event extraction model according to an exemplary embodiment of the present disclosure.

Specifically, referring to FIG. 11, calculating the current event polarity and the current event tense of the to-be-extracted data according to the current trigger word and the target event attribute extraction model included in the target event extraction model may include:

step S1110, generating a second sentence pair according to the current trigger word and the to-be-extracted data;

step S1120, obtaining a third current encoding vector by encoding the second sentence pair with a third dynamic weight fusion Bert layer comprised in the target event attribute extraction model;

step S1130, obtaining the current event polarity of the to-be-extracted data by performing calculation on the third current encoding vector with a third fully connected layer comprised in the target event attribute extraction model; and step S1140, obtaining the current event tense of the to-be-extracted data by performing calculation on the third current coding vector with a fourth fully connected layer comprised in the target event attribute extraction model.

Hereinafter, step S1110 to step S1140 will be explained and illustrated. Specifically, first, the target trigger word and the to-be-extracted data may be spliced into a second sentence pair, and then the second sentence pair is input to the third dynamic weight fusion Bert layer. The [CLS] is used to label the vector for connecting to the two fully connected layers to classify the tense and polarity respectively. The two tasks share the DWF-BERT network and are optimized at the same time. A classification result $\tilde{y}^p$ of the current event polarity and a classification result $\tilde{y}^t$ of the current event tense output by the to-be-trained event attribute extraction model may be respectively shown in the following formula (13) and formula (14):

$$\tilde{y}^p = \text{soft max}(W_p h_{DWF\text{-}CLS} + b_p);$$  Formula (13)

$$\tilde{y}^t = \text{soft max}(W_t h_{DWF\text{-}CLS} + b_t);$$  Formula (14)

where $W_p$ and $W_t$ are parameter matrixes of the target event polarity extraction model, $W_p \in R^{K \times H}$, $W_t \in R^{J \times H}$, K is the number of types of the event polarity, J is the number of types of the event tense, H is a dimension of a hidden layer of the network, $b_p$ and $b_t$ are bias terms (parameters), $h_{DWF\text{-}CLS}$ is a third current encoding vector.

Further, after the current event polarity and the current event tense are obtained, the event text included in the to-be-extracted data may be generated according to the current trigger word, the current event argument, the current event polarity, and the current event tense. Other applications may be also made according to the current trigger word, the current event argument, the current event polarity, and the current event tense, which is not limited in the embodiment.

Figure 12:
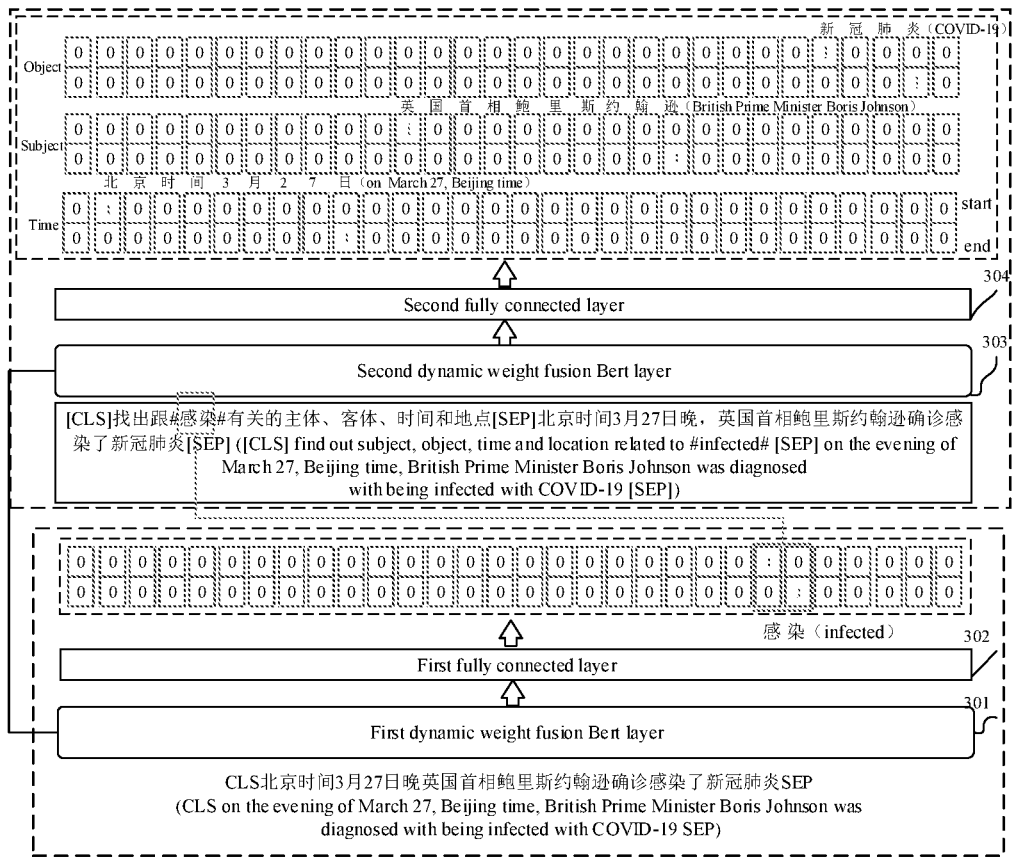
FIG. 12 schematically shows an exemplary diagram of a text event extraction process according to an exemplary embodiment of the present disclosure.

Hereinafter, the text extraction method of the present disclosure will be further illustrated and described with reference to FIG. 12.

First, the text sequence "CLS 北京时间 3 月 27 日晚，英国首相鲍里斯约翰逊确诊感染了 新冠肺炎 SEP (CLS on the evening of March 27, Beijing time, British Prime Minister Boris Johnson was diagnosed with being infected with COVID-19 SEP)" is input to pass through the first dynamic weight Bert layer 301 and the first fully connected layer 302 to obtain the trigger word "感染 (infected)". Then, the query sentence "找出跟#感染#有关的主体，客体，时间和地点 (find out subject, object, time and location related to #infected #)" is generated according to "感染 (infected)" and the first sentence pair "[CLS]找出跟#感染#有关的主体，客体，时间和地点 [SEP] 北京时间 3 月 27 日晚，英国首相鲍里斯约翰逊确诊感染了新冠肺炎 [SEP] ([CLS] find out subject, object, time and location related to #infected # [SEP] on the evening of March 27, Beijing time, British Prime Minister Boris Johnson was diagnosed with being infected with COVID-19 [SEP])" is formed, which is passed through the second dynamic weight fusion Bert layer 303 and the second fully connected layer 304, and the event argument corresponding to the trigger word is obtained, in which the subject is "英国首相鲍里斯约翰逊 (British Prime Minister Boris Johnson)", the object is "新冠肺炎 (COVID-19)", the time is "北京时间 3 月 27 日 (March 27, Beijing time)".

The text extraction method provided by the present disclosure may simultaneously extract the event trigger word and the event argument through a cascaded reading and understanding event extraction model; and at the same time, a weighted fusion is performed on the results of a plurality transformer layers of the pre-trained language model BERT using an adaptive weight, which effectively improves the effect of the model.

In addition, as for the problems in the event extraction such as active and passive conversion and multi-event subject and object sharing, the present disclosure provides a text extraction method based on a cascading structure of reading and understanding event extraction model, which divides the entire model into a two-stage structure. At a first stage, a two-pointer network is used to identify the trigger word in the text. At a second stage, a query is constructed based on the obtained trigger word. At the same time, a plurality of binary-classification networks are used to label the answers, that is, event arguments. The two-stage structure shares a BERT weight and is optimized at the same time to further improve the accuracy of the event text.

Figure 13:
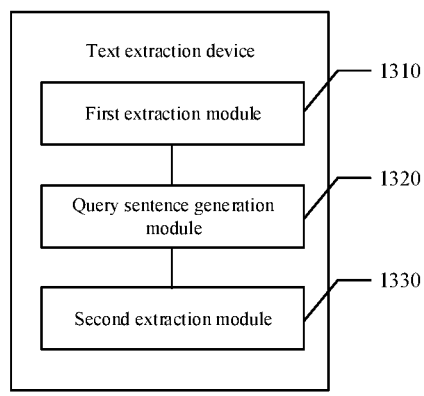
FIG. 13 schematically shows a block diagram of a text extraction device according to an exemplary embodiment of the present disclosure.

The present disclosure also provides a text extraction device. Referring to FIG. 13, the text extraction device may include a first extraction module 1310, a second extraction module 1320, and an event generation module 1330.

The first extraction module 1310 may be configured to acquire to-be-extracted data, and extract a current trigger word in the to-be-extracted data using a target trigger word extraction model included in a target event extraction model.

The query sentence generation module 1320 may be configured to generate a current query sentence according to the current trigger word.

The second extraction module 1330 may be configured to extract a current event argument corresponding to the current trigger word according to the current query sentence and a target argument extraction model included in the target event extraction model, wherein the target trigger word extraction model and the target argument extraction model have a same model structure and weight, and are connected in a cascading manner.

In an exemplary embodiment of the present disclosure, extracting the current trigger word in the to-be-extracted data using the target trigger word extraction model included in the target event extraction model includes:

calculating a semantic text vector of the to-be-extracted data and an importance degree of each semantic text vector to a to-be-extracted text using a first dynamic weight fusion Bert layer included in the target trigger word extraction model of the target event extraction model, and obtaining a first current encoding vector according to the semantic text vector and the importance degree; and obtaining a confidence coefficient that each character included in the to-be-extracted data belongs to the current trigger word by performing calculation on the first current encoding vector with a first fully connected layer included in the target trigger word extraction model;

determining a start position and an end position of the current trigger word according to whether the confidence coefficient is greater than a first preset threshold; and labeling the start position and the end position of the current trigger word with a first preset identifier, and generating the current trigger word by intercepting a character corresponding to a position labeled with the first preset identifier.

In an exemplary embodiment of the present disclosure, the first dynamic weight fusion Bert layer includes a plurality of transformer models.

Calculating the semantic text vector of the to-be-extracted data and the importance degree of each semantic text vector to the to-be-extracted text using the first dynamic weight fusion Bert layer included in the target trigger word extraction model of the target event extraction model, and obtaining the first current encoding vector according to the semantic text vector and the importance degree includes:

obtaining a character embedding vector, a character embedding matrix, and a position embedding matrix of the to-be-extracted data by performing word embedding on the to-be-extracted data;

generating an embedding vector according to the character embedding vector, the character embedding matrix, and the position embedding matrix, and generating a first text semantic vector by inputting the embedding vector into a first transformer model;

obtaining text semantic vectors corresponding to other transformer models by inputting the first text semantic vector into the other transformer models, wherein in the other transformer models, output of a previous transformer model is input of a next transformer model to the previous transformer model; and calculating importance degrees of respective transformer models to the to-be-extracted data, and obtaining the first current encoding vector according to respective importance degrees, the embedding vector, and respective text semantic vectors.

In an exemplary embodiment of the present disclosure, obtaining the first current encoding vector according to the respective importance degrees, the embedding vector, and the respective text semantic vectors includes:

concatenating the respective importance degrees, and normalizing the respective importance degrees concatenated; and obtaining the first current coding vector according to the respective importance degrees normalized, the embedding vector, and the respective text semantic vectors.

In an exemplary embodiment of the present disclosure, extracting the current event argument corresponding to the current trigger word according to the current query sentence and the target argument extraction model included in the target event extraction model includes:
- generating a first sentence pair according to the to-be-extracted data and the current query sentence, and obtaining a second current encoding vector by encoding the first sentence pair with a second dynamic weight fusion Bert layer included in the target argument extraction model of the target event extraction model;
- calculating a span of the current event argument in the to-be-extracted data according to the second current encoding vector, and obtaining probabilities that characters, at all positions from a start position pointer to an end position pointer, of an argument included in each span belong to a start position and an end position of the current event argument by classifying the argument included in the span, wherein each span includes the start position pointer and the end position pointer;
- determining the start position and the end position of the current event argument according to whether the probability is greater than a second preset threshold, and labeling the start position and the end position of the current event argument with a second preset identifier; and
- generating the current event argument by intercepting a character corresponding to a position labeled with the second preset identifier.

In an exemplary embodiment of the present disclosure, obtaining the probabilities that the characters, at all the positions from the start position pointer to the end position pointer, of the argument included in each span belong to the start position and the end position of the current event argument by classifying the argument included in the span includes:
- obtaining a role label of the argument by classifying roles to which the arguments included in the span belong with a plurality of binary-classification networks;
- generating a start position matrix and an end position matrix according to start position pointers and end position pointers of all the role labels, wherein each row in the start position matrix and the end position matrix represents a role type, and each column corresponds to each character of the to-be-extracted data; and
- obtaining the probabilities that the characters, at all the positions from the start position pointer to the end position pointer, of the argument included in each span belong to the start position and the end position of the current event argument by performing calculation on the start position matrix and the end position matrix with a second fully connected layer included in the target argument extraction model.

In an exemplary embodiment of the present disclosure, the text extraction device may further include:
- a third extraction module, which may be configured to calculate a current event polarity and a current event tense of the to-be-extracted data according to the current trigger word and a target event attribute extraction model included in the target event extraction model.

In an exemplary embodiment of the present disclosure, calculating the current event polarity and the current event tense of the to-be-extracted data according to the current trigger word and the target event attribute extraction model included in the target event extraction model includes:
- generating a second sentence pair according to the current trigger word and the to-be-extracted data;
- obtaining a third current encoding vector by encoding the second sentence pair with a third dynamic weight fusion Bert layer included in the target event attribute extraction model;
- obtaining the current event polarity of the to-be-extracted data by performing calculation on the third current encoding vector with a third fully connected layer included in the target event attribute extraction model; and
- obtaining the current event tense of the to-be-extracted data by performing calculation on the third current encoding vector with a fourth fully connected layer included in the target event attribute extraction model.

In an exemplary embodiment of the present disclosure, the text extraction device further includes:
- a first calculation module, which may be configured to acquire original text data, and calculate an original trigger word included in the original text data according to a to-be-trained trigger word extraction model included in a to-be-trained event extraction model;
- a fourth extraction module, which may be configured to generate an original query sentence according to the original trigger word, and extract an original event argument included in the original text data according to the original query sentence and the to-be-trained argument extraction model included in the to-be-trained event extraction model;
- a first loss function construction module, which may be configured to construct a first loss function according to the target trigger word and the original trigger word of the original text data, and construct a second loss function according to the target event argument and the original event argument of the original news event; and
- a first parameter adjustment module, which may be configured to obtain the target event extraction model by adjusting a parameter included in the to-be-trained event extraction model according to the first loss function and the second loss function.

In an exemplary embodiment of the present disclosure, obtaining the target event extraction model by adjusting the parameter included in the to-be-trained event extraction model according to the first loss function and the second loss function comprises:
- obtaining a target loss function by performing a summation operation on the first loss function and the second loss function; and
- obtaining the target event extraction model by adjusting the parameter included in the to-be-trained event extraction model according to the target loss function.

In an exemplary embodiment of the present disclosure, the text extraction device further includes:
- a second calculation module, which may be configured to calculate an original event polarity and an original event tense of the original text data according to the original trigger word and a to-be-trained event attribute extraction model;
- a second loss function calculation module, which may be configured to construct a third loss function according to a target event polarity, a target event tense, an original event polarity, and an original event tense of the original text data; and
- a second parameter adjustment block, which may be configured to obtain a target attribute extraction model by adjusting the parameter included in the to-be-trained attribute extraction model according to the third loss function.

The specific details of each module in the above text extraction device have been described in detail in the corresponding text extraction method, which will not be repeated herein.

Further, in some exemplary embodiments of the present disclosure, the above mentioned transformer model and transformer network may refer to a transformer encoder.

It should be noted that although several modules or units of the device for action execution are mentioned in the above detailed description, such division is not mandatory. In fact, according to the embodiments of the present disclosure, the features and functions of two or more modules or units described above may be embodied in one module or unit. To be contrary, the feature and function of one module or unit described above may be further divided into being embodied by a plurality of modules or units.

In addition, although the various steps of the method of the present disclosure are described in a specific order in the drawings, which does not require or imply that these steps must be performed in the specific order, or that all the steps shown must be performed to achieve a desired result. Additionally or alternatively, some steps may be omitted, a plurality of steps may be combined into one step for execution, and/or one step may be decomposed into a plurality of steps for execution.

In an exemplary embodiment of the present invention, an electronic device capable of implementing the above method is also provided.

Those skilled in the art may understand that various aspects of the present disclosure may be implemented as a system, a method, or a program product. Therefore, various aspects of the present disclosure may be specifically implemented in the following forms, namely: a complete hardware implementation, a complete software implementation (including firmware, microcode, and the like), or a combination of hardware and software implementations, which may be collectively referred to as "circuit", "module", or "system" herein.

An electronic device 1400 according to an embodiment of the present disclosure will be described below with reference to FIG. 14. The electronic device 1400 shown in FIG. 14 is only an example, which does not limit the function and use scope of the embodiment of the present disclosure.

Figure 14:
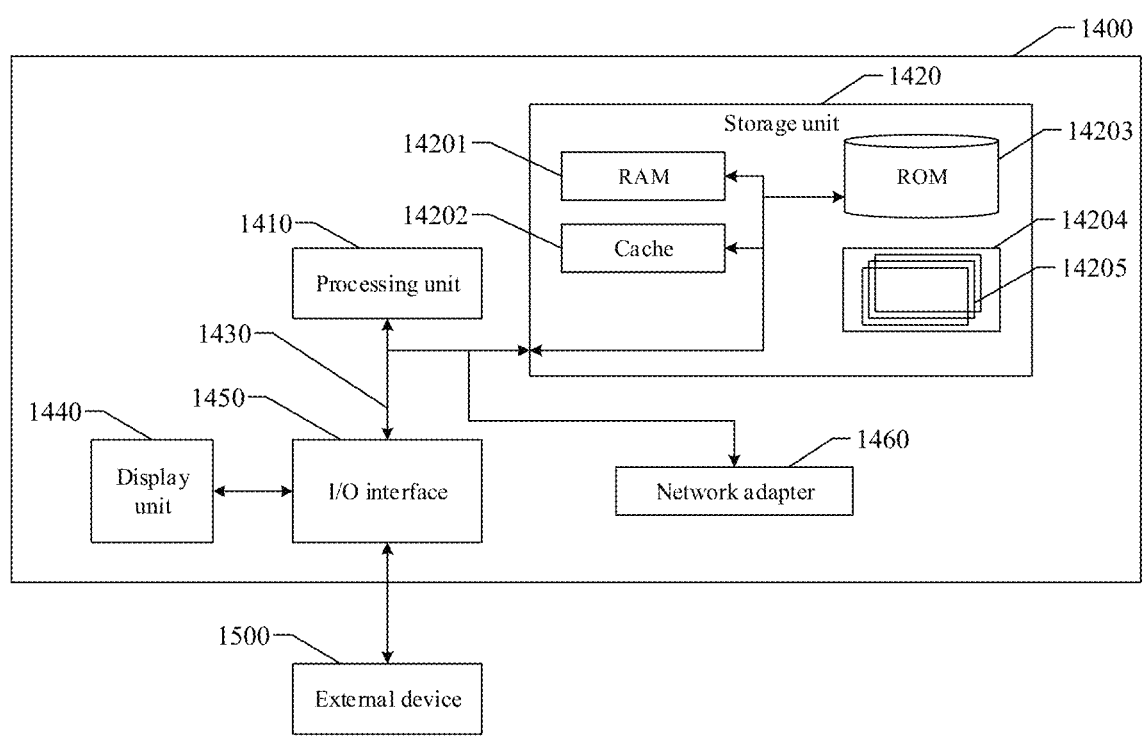
FIG. 14 schematically shows an electronic device for implementing the above text extraction method according to an exemplary embodiment of the present disclosure.

As shown in FIG. 14, the electronic device 1400 is in the form of a general-purpose computing device. The components of the electronic device 1400 may include, but are not limited to: the aforementioned at least one processing unit 1410, the aforementioned at least one storage unit 1420, a bus 1430 connecting different system components (including the storage unit 1420 and the processing unit 1410), and a display unit 1440.

The storage unit stores a program code, and the program code may be executed by the processing unit 1410, so that the processing unit 1410 executes the steps of the various exemplary implementations of the present disclosure described in the exemplary method section of the specification. For example, the processing unit 1410 may perform (as shown in FIG. 1): step S110, acquiring to-be-extracted data, and extracting a current trigger word in the to-be-extracted data using a target trigger word extraction model included in a target event extraction model; step S120, generating a current query sentence according to the current trigger word; and step S130, extracting a current event argument corresponding to the current trigger word according to the current query sentence and a target argument extraction model included in the target event extraction model, wherein the target trigger word extraction model and the target argument extraction model have a same model structure and parameter, and are connected in a cascading manner.

The storage unit 1420 may include a readable medium in the form of a volatile storage unit, such as a random access storage unit (RAM) 14201 and/or a cache storage unit 14202, and may further include a read-only storage unit (ROM) 14203.

The storage unit 1420 may also include a program/application tool 14204 having a set (at least one) of program modules 14205. Such program module 14205 includes but is not limited to: an operating system, one or more application programs, other program modules, and program data. Each or some combination of these examples may include the implementation of a network environment.

The bus 1430 may be one or more of several types of bus structures, including a storage unit bus or a storage unit controller, a peripheral bus, a graphics acceleration port, a processing unit, or a local area bus that uses any of a variety of bus structures.

The electronic device 1400 may also communicate with one or more external devices 1500 (such as a keyboard, a pointing device, a Bluetooth device), and may also communicate with one or more devices that enable a user to interact with the electronic device 1400, and/or communicate with any device (such as a router, modem) that enables the electronic device 1400 to communicate with one or more other computing devices. Such communication may be performed through an input/output (I/O) interface 1450. In addition, the electronic device 1400 may also communicate with one or more networks (for example, a local area network (LAN), a wide area network (WAN), and/or a public network, such as the Internet) through the network adapter 1460. As shown in the figure, the network adapter 1460 communicates with other modules of the electronic device 1400 through the bus 1430. It should be understood that although not shown in the figure, other hardware and/or software modules may be used in conjunction with the electronic device 1400, including but not limited to: a microcode, a device driver, a redundant processing unit, an external disk drive array, a RAID system, a tape drive and a data backup storage system.

Through the description of the foregoing embodiments, those skilled in the art may easily understand that the exemplary embodiments described herein may be implemented by software, or may be implemented by combining software with necessary hardware. Therefore, the technical solution according to the embodiments of the present disclosure may be embodied in the form of a software product, which may be stored in a non-volatile storage medium (which may be a CD-ROM, U disk, mobile hard disk) or on the network, and includes several instructions to cause a computing device (which may be a personal computer, a server, a terminal device, or a network device) to execute the method according to the embodiment of the present disclosure.

An exemplary embodiment of the present disclosure also provides a computer-readable storage medium having a program product stored thereon which is capable of implementing the above-mentioned method in the specification. In some possible implementations, various aspects of the present disclosure may also be implemented in the form of a program product, which includes a program code. When the program product runs on a terminal device, the program code is used to enable the terminal device to execute the steps of the various exemplary implementations of the present disclosure described in the above-mentioned exemplary method section of the specification.

The program product for implementing the above method according to the embodiment of the present disclosure may adopt a portable compact disk read-only memory (CD-ROM) and include program code, and may run on a terminal device, such as a personal computer, however, the program product of the present disclosure is not limited thereto. In the present disclosure, the readable storage medium may be any tangible medium that contains or stores a program, and the program may be used by or in combination with an instruction execution system, device, or element.

The program product may use any combination of one or more readable media. The readable medium may be a readable signal medium or a readable storage medium. The readable storage medium may be, for example, but not limited to, an electrical, magnetic, optical, electromagnetic, infrared, or semiconductor system, device, or element, or any combination thereof. More specific examples (non-exhaustive list) of readable storage media include: an electrical connection with one or more wires, a portable disk, a hard disk, a random access memory (RAM), a read only memory (ROM), an erasable programmable read only memory (EPROM or flash memory), an optical fiber, a portable compact disk read only memory (CD-ROM), an optical storage device, a magnetic storage device, or any suitable combination thereof.

The computer-readable signal medium may include a data signal propagated in baseband or as a part of a carrier wave, in which a readable program code is carried. The propagated data signal may take many forms, including but not limited to an electromagnetic signal, an optical signal, or any suitable combination thereof. The readable signal medium may also be any readable medium other than the readable storage medium, and the readable medium may send, propagate, or transmit a program for use by or in combination with the instruction execution system, device or element.

The program code contained on the readable medium may be transmitted by any suitable medium, including but not limited to wireless, wired, optical cable, RF or any suitable combination thereof.

The program code for performing the operations of the present disclosure may be written in any combination of one or more programming languages. The programming languages include object-oriented programming languages such as Java, C++, and further include conventional procedural programming languages such as "C" language or similar programming language. The program code may be executed entirely on the user's computing device, executed partly on the user's device, executed as an independent software package, executed partly on the user's computing device and partly on a remote computing device, or executed entirely on the remote computing device or server. In the case of the remote computing device, the remote computing device may be connected to a user computing device through any kind of network, including a local area network (LAN) or a wide area network (WAN), or may be connected to an external computing device (for example, via the Internet using an Internet service provider).

In addition, the above-mentioned drawings are merely schematic illustrations of the processes included in the method according to the exemplary embodiment of the present disclosure, and are not intended for limitation. It is easy to understand that the processes shown in the above drawings do not indicate or limit the time sequence of these processes. In addition, it is easy to understand that these processes may be executed synchronously or asynchronously in a plurality of modules, for example.

Those skilled in the art will easily conceive of other embodiments of the present disclosure after considering the description and practicing the present invention. The present application is intended to cover any variations, uses, or adaptive changes of the present invention, which follow the general principles of the present disclosure and include the common knowledge or conventional technical means in the technical field that the present invention belongs to. The description and the embodiments are only regarded as being exemplary, and the true scope and spirit of the present disclosure are pointed out by the claims.

What is claimed is:

1. A text extraction method, performed by a server, comprising:
   acquiring to-be-extracted text;
   extracting a current trigger word in the to-be-extracted text using a target trigger word extraction model comprised in a target event extraction model;
   generating a current query sentence according to the current trigger word; and
   extracting a current event argument corresponding to the current trigger word according to the current query sentence using a target argument extraction model comprised in the target event extraction model; and
   generating an event text in a structured form based on the current trigger word and the current event argument,
   wherein the target trigger word extraction model and the target argument extraction model have a same model structure and parameter, and are connected in a cascading manner.

2. The text extraction method according to claim 1, wherein extracting the current trigger word in the to-be-extracted text using the target trigger word extraction model comprised in the target event extraction model comprises:
   calculating a semantic text vector of the to-be-extracted text and an importance degree of each semantic text vector to the to-be-extracted text using a first dynamic weight fusion Bert layer comprised in the target trigger word extraction model of the target event extraction model, and obtaining a first current encoding vector according to the semantic text vector and the importance degree;
   obtaining a confidence coefficient that each character comprised in the to-be-extracted text belongs to the current trigger word by performing calculation on the first current encoding vector with a first fully connected layer comprised in the target trigger word extraction model;
   determining a start position and an end position of the current trigger word according to whether the confidence coefficient is greater than a first preset threshold; and
   labeling the start position and the end position of the current trigger word with a first preset identifier, and generating the current trigger word by intercepting a character corresponding to a position labeled with the first preset identifier.

3. The text extraction method according to claim 2, wherein:
   the first dynamic weight fusion Bert layer comprises a plurality of transformer models; and
   calculating the semantic text vector of the to-be-extracted text and the importance degree of each semantic text vector to the to-be-extracted text using the first dynamic weight fusion Bert layer comprised in the target trigger word extraction model of the target event extraction model, and obtaining the first current encoding vector according to the semantic text vector and the importance degree comprises:
  obtaining a character embedding vector, a character embedding matrix, and a position embedding matrix of the to-be-extracted text by performing word embedding on the to-be-extracted text;
  generating an embedding vector according to the character embedding vector, the character embedding matrix, and the position embedding matrix, and generating a first text semantic vector by inputting the embedding vector into a first transformer model;
  obtaining text semantic vectors corresponding to other transformer models by inputting the first text semantic vector into the other transformer models, wherein in the other transformer models, output of a previous transformer model is input of a next transformer model to the previous transformer model; and
  calculating importance degrees of respective transformer models to the to-be-extracted data, and obtaining the first current encoding vector according to respective importance degrees, the embedding vector, and respective text semantic vectors.

4. The text extraction method according to claim 3, wherein obtaining the first current encoding vector according to the respective importance degrees, the embedding vector, and the respective text semantic vectors comprises:
  concatenating the respective importance degrees, and normalizing the respective importance degrees concatenated; and
  obtaining the first current coding vector according to the respective importance degrees normalized, the embedding vector, and the respective text semantic vectors.

5. The text extraction method according to claim 2, wherein extracting the current event argument corresponding to the current trigger word according to the current query sentence using the target argument extraction model comprised in the target event extraction model comprises:
  generating a first sentence pair according to the to-be-extracted text and the current query sentence, and obtaining a second current encoding vector by encoding the first sentence pair with a second dynamic weight fusion Bert layer comprised in the target argument extraction model of the target event extraction model;
  calculating a span of the current event argument in the to-be-extracted text according to the second current encoding vector, and obtaining probabilities that characters, at all positions from a start position pointer to an end position pointer, of an argument comprised in each span belong to a start position and an end position of the current event argument by classifying the argument comprised in the span, wherein each span comprises the start position pointer and the end position pointer;
  determining the start position and the end position of the current event argument according to whether the probability is greater than a second preset threshold, and labeling the start position and the end position of the current event argument with a second preset identifier; and
  generating the current event argument by intercepting a character corresponding to a position labeled with the second preset identifier.

6. The text extraction method according to claim 5, wherein obtaining the probabilities that the characters, at all the positions from the start position pointer to the end position pointer, of the argument comprised in each span belong to the start position and the end position of the current event argument by classifying the argument comprised in the span comprises:
  obtaining a role label of the argument by classifying roles to which the arguments comprised in the span belong with a plurality of binary-classification networks;
  generating a start position matrix and an end position matrix according to start position pointers and end position pointers of all the role labels, wherein each row in the start position matrix and the end position matrix represents a role type, and each column corresponds to each character of the to-be-extracted text; and
  obtaining the probabilities that the characters, at all the positions from the start position pointer to the end position pointer, of the argument comprised in each span belong to the start position and the end position of the current event argument by performing calculation on the start position matrix and the end position matrix with a second fully connected layer comprised in the target argument extraction model.

7. The text extraction method according to claim 1, further comprising:
  calculating a current event polarity and a current event tense of the to-be-extracted text according to the current trigger word and a target event attribute extraction model comprised in the target event extraction model.

8. The text extraction method according to claim 7, wherein calculating the current event polarity and the current event tense of the to-be-extracted text according to the current trigger word and the target event attribute extraction model comprised in the target event extraction model comprises:
  generating a second sentence pair according to the current trigger word and the to-be-extracted text;
  obtaining a third current encoding vector by encoding the second sentence pair with a third dynamic weight fusion Bert layer comprised in the target event attribute extraction model;
  obtaining the current event polarity of the to-be-extracted text by performing calculation on the third current encoding vector with a third fully connected layer comprised in the target event attribute extraction model; and
  obtaining the current event tense of the to-be-extracted text by performing calculation on the third current coding vector with a fourth fully connected layer comprised in the target event attribute extraction model.

9. The text extraction method according to claim 1, further comprising:
  acquiring original text, and calculating an original trigger word comprised in the original text according to a to-be-trained trigger word extraction model comprised in a to-be-trained event extraction model;
  generating an original query sentence according to the original trigger word, and extracting an original event argument comprised in the original text according to the original query sentence using the to-be-trained argument extraction model comprised in the to-be-trained event extraction model;
  constructing a first loss function according to the target trigger word and the original trigger word of the original text, and constructing a second loss function according to the target event argument and the original event argument of the original news event; and obtaining the target event extraction model by adjusting a parameter comprised in the to-be-trained event extraction model according to the first loss function and the second loss function.

10. The text extraction method according to claim 9, wherein obtaining the target event extraction model by adjusting the parameter comprised in the to-be-trained event extraction model according to the first loss function and the second loss function comprises:
obtaining a target loss function by performing a summation operation on the first loss function and the second loss function; and
obtaining the target event extraction model by adjusting the parameter comprised in the to-be-trained event extraction model according to the target loss function.

11. The text extraction method according to claim 9, further comprising:
calculating an original event polarity and an original event tense of the original text according to the original trigger word and a to-be-trained event attribute extraction model;
constructing a third loss function according to a target event polarity, a target event tense, an original event polarity, and an original event tense of the original text; and
obtaining a target attribute extraction model by adjusting the parameter comprised in the to-be-trained attribute extraction model according to the third loss function.

12. A non-transitory computer-readable storage medium having program instructions stored thereon that, when executed by at least one hardware processor, direct a server comprising the at least one hardware processor to:
acquire to-be-extracted text;
extract a current trigger word in the to-be-extracted text by using a target trigger word extraction model comprised in a target event extraction model;
generate a current query sentence according to the current trigger word; and
extract a current event argument corresponding to the current trigger word according to the current query sentence using a target argument extraction model comprised in the target event extraction model;
generate an event text in a structured form based on the current trigger word and the current event argument,
wherein the target trigger word extraction model and the target argument extraction model have a same model structure and parameter, and are connected in a cascading manner.

13. A system, comprising:
a server comprising at least one hardware processor; and
a memory having program instructions stored thereon that, when executed by the at least one hardware processor, direct the server to:
acquire to-be-extracted text;
extract a current trigger word in the to-be-extracted text by using a target trigger word extraction model comprised in a target event extraction model;
generate a current query sentence according to the current trigger word; and
extract a current event argument corresponding to the current trigger word according to the current query sentence using a target argument extraction model comprised in the target event extraction model; and
generate an event text in a structured form based on the current trigger word and the current event argument,
wherein the target trigger word extraction model and the target argument extraction model have a same model structure and parameter, and are connected in a cascading manner.

14. The system according to claim 13, wherein extracting the current trigger word in the to-be-extracted text by using the target trigger word extraction model comprised in the target event extraction model comprises:
calculating a semantic text vector of the to-be-extracted text and an importance degree of each semantic text vector to a to-be-extracted text by using a first dynamic weight fusion Bert layer comprised in the target trigger word extraction model of the target event extraction model, and obtaining a first current encoding vector according to the semantic text vector and the importance degree;
obtaining a confidence coefficient that each character comprised in the to-be-extracted text belongs to the current trigger word by performing calculation on the first current encoding vector with a first fully connected layer comprised in the target trigger word extraction model;
determining a start position and an end position of the current trigger word according to whether the confidence coefficient is greater than a first preset threshold; and
labeling the start position and the end position of the current trigger word with a first preset identifier, and generating the current trigger word by intercepting a character corresponding to a position labeled with the first preset identifier.

15. The system according to claim 14, wherein:
the first dynamic weight fusion Bert layer comprises a plurality of transformer models; and
calculating the semantic text vector of the to-be-extracted text and the importance degree of each semantic text vector to the to-be-extracted text by using the first dynamic weight fusion Bert layer comprised in the target trigger word extraction model of the target event extraction model, and obtaining the first current encoding vector according to the semantic text vector and the importance degree comprises:
obtaining a character embedding vector, a character embedding matrix, and a position embedding matrix of the to-be-extracted text by performing word embedding on the to-be-extracted text;
generating an embedding vector according to the character embedding vector, the character embedding matrix, and the position embedding matrix, and generating a first text semantic vector by inputting the embedding vector into a first transformer model;
obtaining text semantic vectors corresponding to other transformer models by inputting the first text semantic vector into the other transformer models, wherein in the other transformer models, output of a previous transformer model is input of a next transformer model to the previous transformer model; and
calculating importance degrees of respective transformer models to the to-be-extracted text, and obtaining the first current encoding vector according to respective importance degrees, the embedding vector, and respective text semantic vectors.

16. The system according to claim 15, wherein obtaining the first current encoding vector according to the respective importance degrees, the embedding vector, and the respective text semantic vectors comprises:

concatenating the respective importance degrees, and normalizing the respective importance degrees concatenated; and obtaining the first current coding vector according to the respective importance degrees normalized, the embedding vector, and the respective text semantic vectors.

17. The system according to claim 14, wherein extracting the current event argument corresponding to the current trigger word according to the current query sentence using the target argument extraction model comprised in the target event extraction model comprises:

generating a first sentence pair according to the to-be-extracted text and the current query sentence, and obtaining a second current encoding vector by encoding the first sentence pair with a second dynamic weight fusion Bert layer comprised in the target argument extraction model of the target event extraction model;

calculating a span of the current event argument in the to-be-extracted text according to the second current encoding vector, and obtaining probabilities that characters, at all positions from a start position pointer to an end position pointer, of an argument comprised in each span belong to a start position and an end position of the current event argument by classifying the argument comprised in the span, wherein each span comprises the start position pointer and the end position pointer;

determining the start position and the end position of the current event argument according to whether the probability is greater than a second preset threshold, and labeling the start position and the end position of the current event argument with a second preset identifier; and generating the current event argument by intercepting a character corresponding to a position labeled with the second preset identifier.

18. The system according to claim 17, wherein obtaining the probabilities that the characters, at all the positions from the start position pointer to the end position pointer, of the argument comprised in each span belong to the start position and the end position of the current event argument by classifying the argument comprised in the span comprises:

obtaining a role label of the argument by classifying roles to which the arguments comprised in the span belong with a plurality of binary-classification networks;

generating a start position matrix and an end position matrix according to start position pointers and end position pointers of all the role labels, wherein each row in the start position matrix and the end position matrix represents a role type, and each column corresponds to each character of the to-be-extracted text; and obtaining the probabilities that the characters, at all the positions from the start position pointer to the end position pointer, of the argument comprised in each span belong to the start position and the end position of the current event argument by performing calculation on the start position matrix and the end position matrix with a second fully connected layer comprised in the target argument extraction model.

19. The system according to claim 13, wherein the at least one hardware processor is further directed to:

calculate a current event polarity and a current event tense of the to-be-extracted text according to the current trigger word and a target event attribute extraction model comprised in the target event extraction model.

20. The system according to claim 19, wherein calculating the current event polarity and the current event tense of the to-be-extracted text according to the current trigger word and the target event attribute extraction model comprised in the target event extraction model comprises:

generating a second sentence pair according to the current trigger word and the to-be-extracted text;

obtaining a third current encoding vector by encoding the second sentence pair with a third dynamic weight fusion Bert layer comprised in the target event attribute extraction model;

obtaining the current event polarity of the to-be-extracted text by performing calculation on the third current encoding vector with a third fully connected layer comprised in the target event attribute extraction model; and obtaining the current event tense of the to-be-extracted text by performing calculation on the third current coding vector with a fourth fully connected layer comprised in the target event attribute extraction model.

* * * * *